US012103189B2

(12) United States Patent
Watanabe et al.

(10) Patent No.: US 12,103,189 B2
(45) Date of Patent: Oct. 1, 2024

(54) ARTICLE DISCHARGE SYSTEM

(71) Applicant: Ishida Co., Ltd., Kyoto (JP)

(72) Inventors: Kousuke Watanabe, Ritto (JP); Masaaki Hojo, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 684 days.

(21) Appl. No.: 17/192,217

(22) Filed: Mar. 4, 2021

(65) Prior Publication Data
US 2021/0283781 A1  Sep. 16, 2021

(30) Foreign Application Priority Data

Mar. 13, 2020  (JP) .................................. 2020-043977

(51) Int. Cl.
*B25J 9/16* (2006.01)
*B25J 13/08* (2006.01)
*B25J 15/00* (2006.01)
*G01G 19/393* (2006.01)
*G01G 19/52* (2006.01)

(52) U.S. Cl.
CPC ........... *B25J 9/1694* (2013.01); *B25J 13/085* (2013.01); *B25J 15/0052* (2013.01); *G01G 19/393* (2013.01); *G01G 19/52* (2013.01)

(58) Field of Classification Search
CPC .... B25J 9/1694; B25J 13/085; B25J 15/0052; G01G 19/393; G01G 19/52
See application file for complete search history.

(56) References Cited

U.S. PATENT DOCUMENTS 5,321,212 A * 6/1994 Wadell ................ G01G 19/393
177/25.18

FOREIGN PATENT DOCUMENTS

| CN | 110088580 A | 8/2019 |
| JP | H063182 A | 1/1994 |
| JP | 2013-003102 A | 1/2013 |
| JP | 2015-523224 A | 8/2015 |

(Continued)

OTHER PUBLICATIONS

English Translation of JP 2016-156707, Sep. 20, 2023, espacenet.com (Year: 2023).*

(Continued)

*Primary Examiner* — Vishal Pancholi
*Assistant Examiner* — Robert K Nichols, II
(74) *Attorney, Agent, or Firm* — Studebaker & Brackett PC

(57) ABSTRACT

The article discharge system includes plural grippers, weight acquisition units, and a control unit. The grippers grip the articles. The weight acquisition units acquire weight values of the articles that each of the plural grippers grips. The control unit causes the plural grippers to grip the some articles from the article group disposed in the placement unit and, based on the result of a combination calculation using the weight values of the articles that each of the plural grippers grips, causes a predetermined combination of the grippers to release and discharge the articles. During the period after the control unit has caused the grippers to release the articles and before the control unit next causes the grippers to grip the articles, the control unit implements a zero correction process on the weight acquisition units corresponding to the grippers that were caused to release the articles.

5 Claims, 22 Drawing Sheets

(56) References Cited

FOREIGN PATENT DOCUMENTS

| | | |
|---|---|---|
| JP | 2016-156707 A | 9/2016 |
| JP | 2018-192543 A | 12/2018 |

OTHER PUBLICATIONS

An Office Action mailed by China National Intellectual Property Administration on May 20, 2022, which corresponds to Chinese Patent Application No. 202110244759.4 and is related to U.S. Appl. No. 17/192,217 with English language translation.

The extended European search report issued by the European Patent Office on Jul. 22, 2021, which corresponds to European Patent Application No. 21161351.8-1001 and is related to U.S. Appl. No. 17/192,217.

An Office Action mailed by the Korean Intellectual Property Office on Jul. 1, 2022, which corresponds to Korean Patent Application No. 10-2021-0030738 and is related to U.S. Appl. No. 17/192,217; with English language translation.

\* cited by examiner

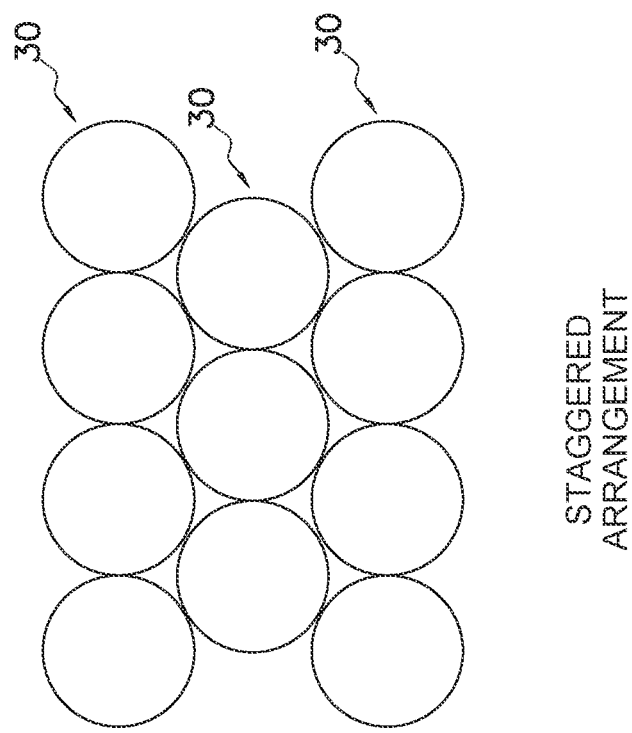
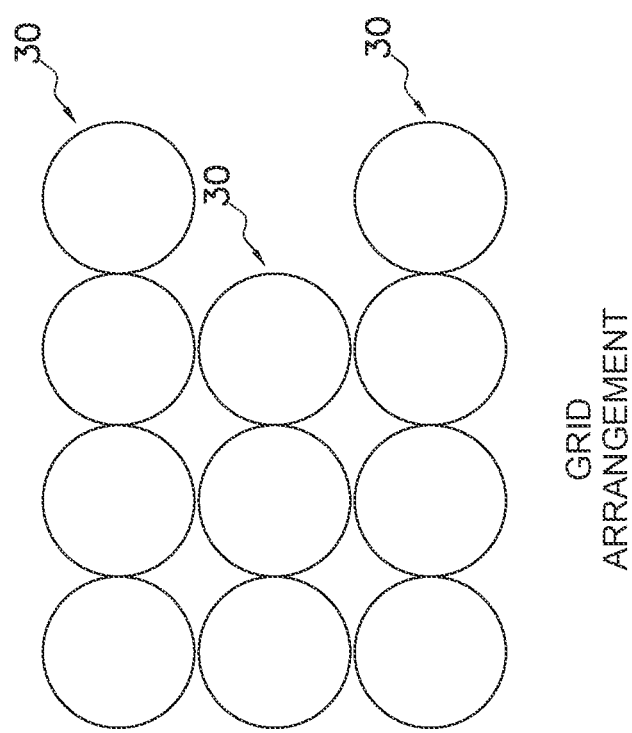
FIG. 6

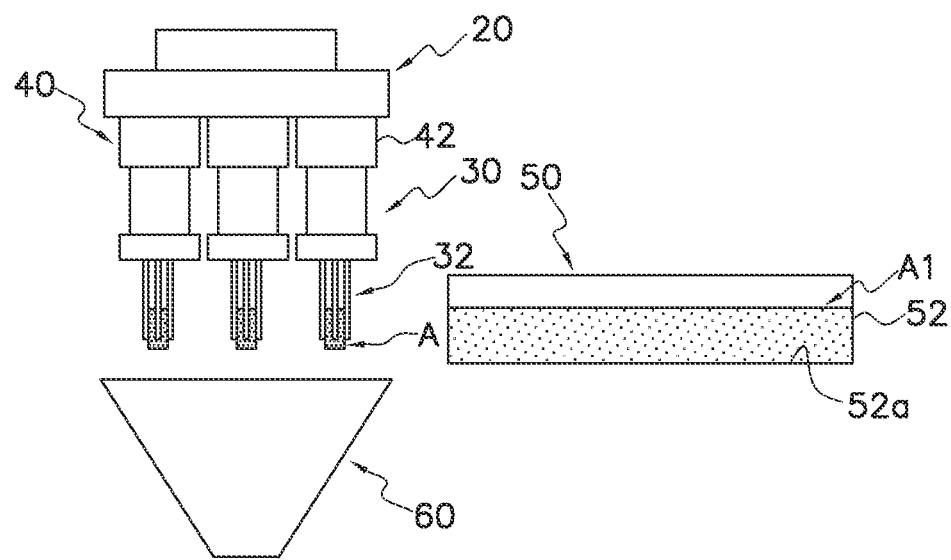
F I G. 8E
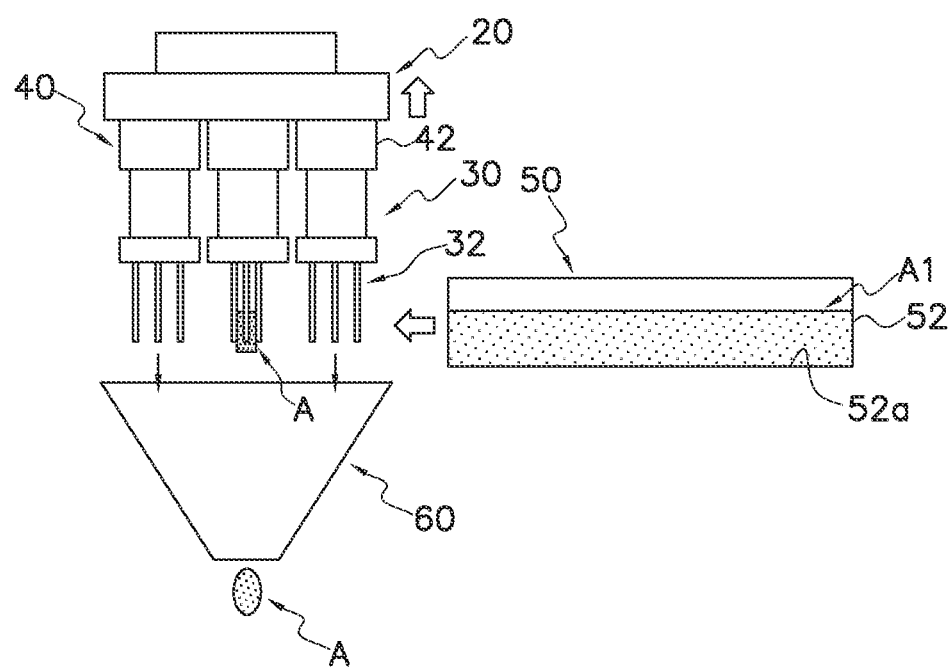
F I G. 8F

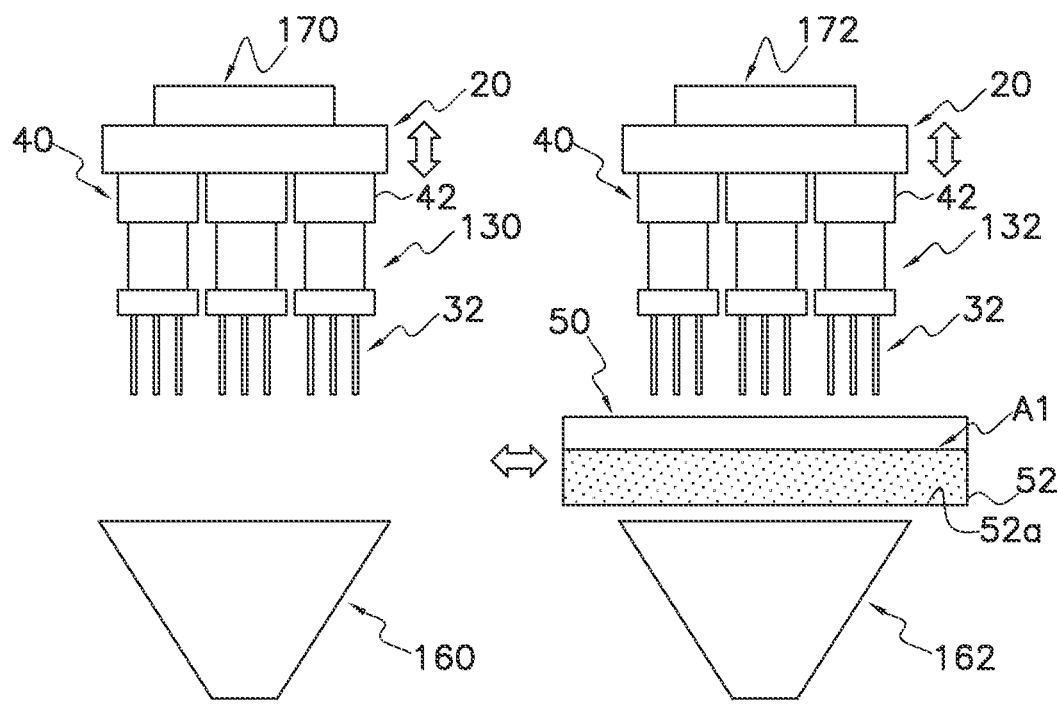
F I G. 10

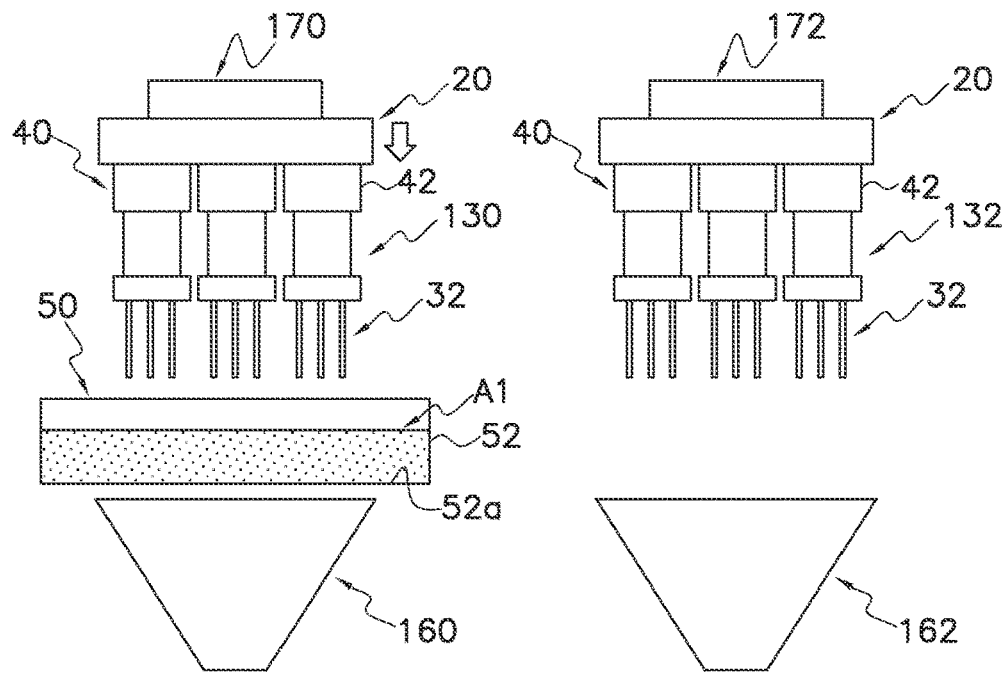
F I G. 11A
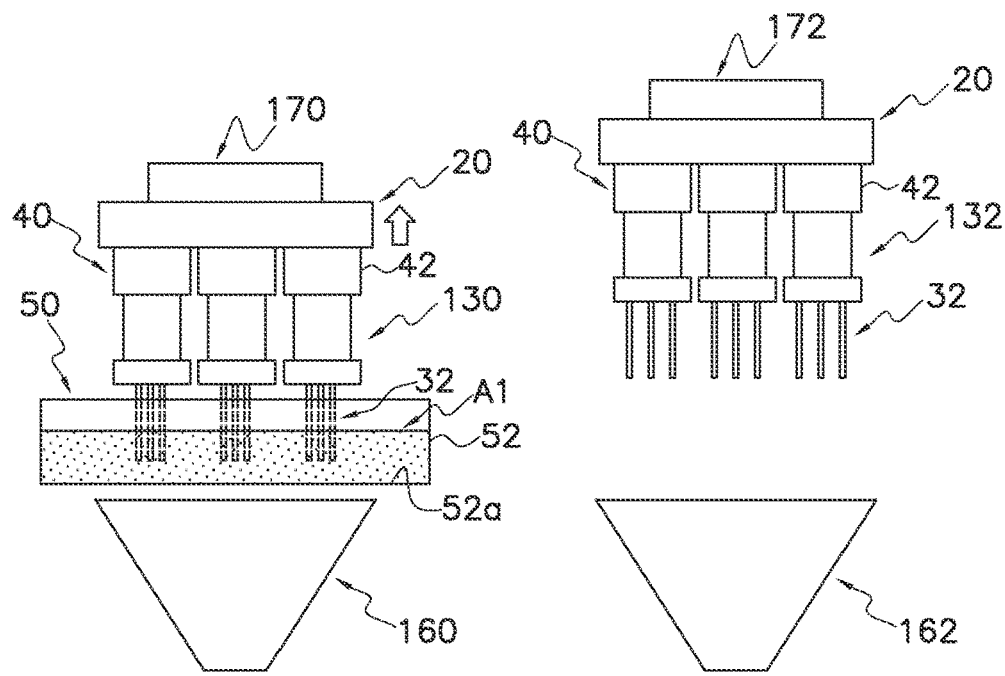
F I G. 11B

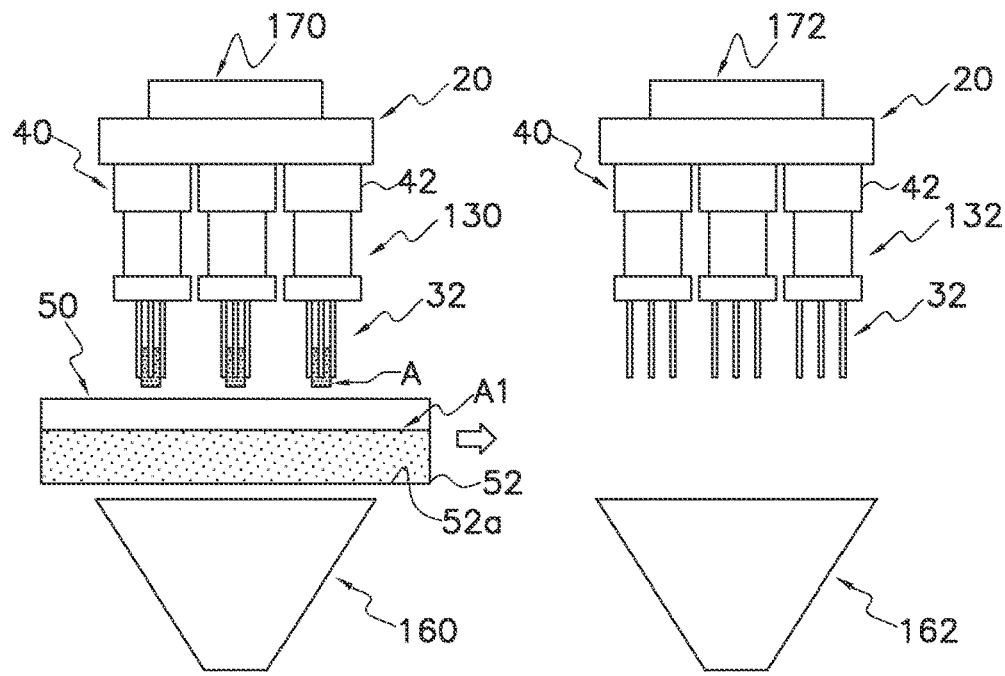
F I G. 11C
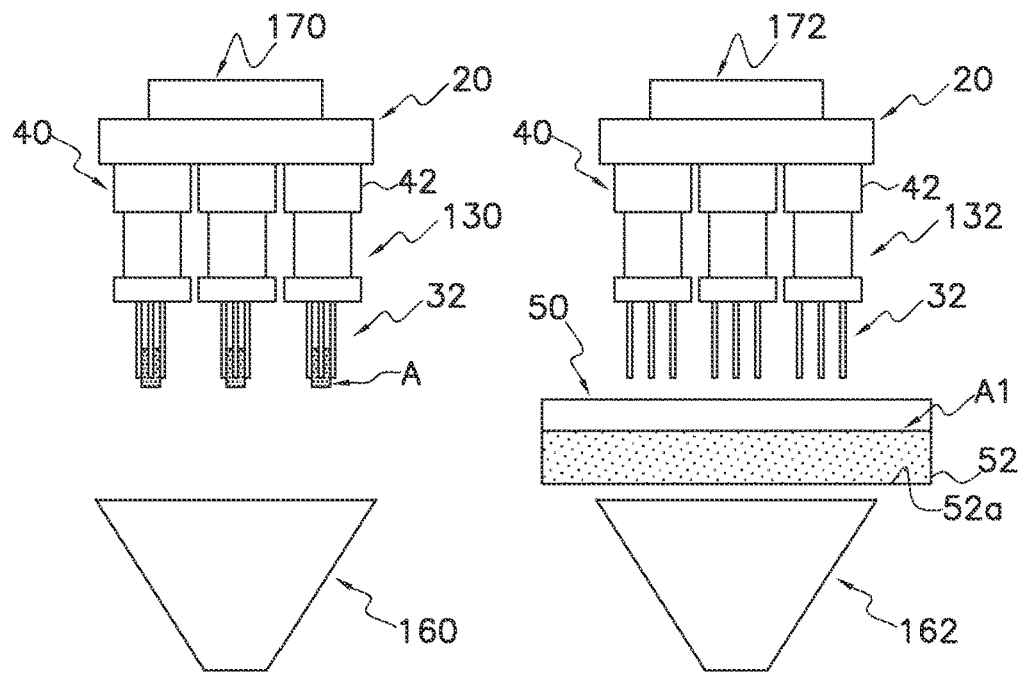
F I G. 11D

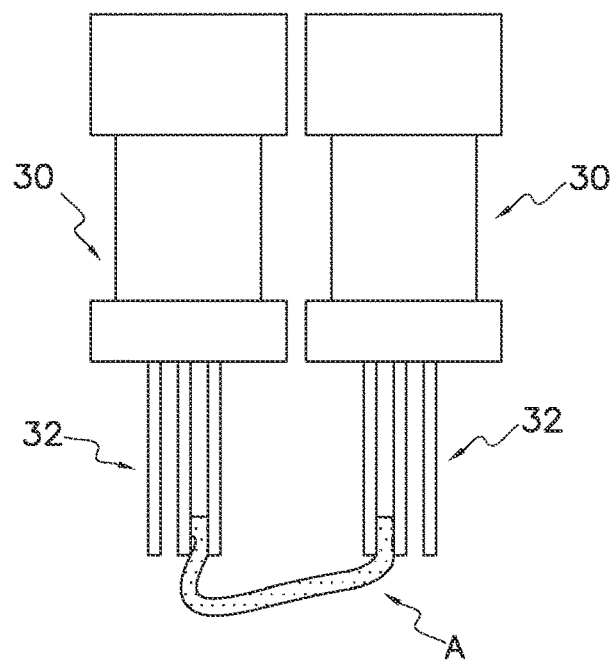
F I G. 13A
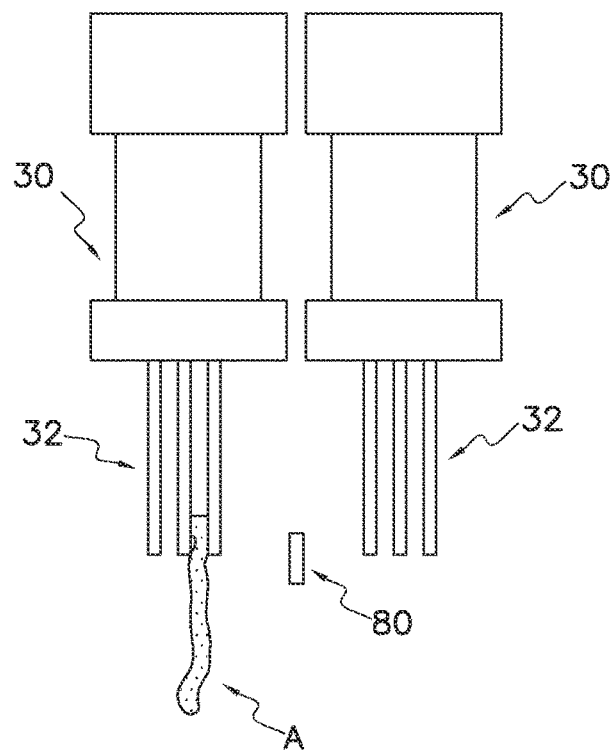
F I G. 13B

ARTICLE DISCHARGE SYSTEM

BACKGROUND

Technical Field

The present invention relates to an article discharge system that pulls out and discharges some articles from an article group.

Related Art

An article discharge system that uses plural grippers to pull out and discharge articles from an article group is known, such as disclosed in patent document 1 (JP-A No. H6-3182). The article discharge system, based on the result of a combination calculation using weight values of the articles that each of the grippers is gripping, causes a predetermined combination of the grippers to release the articles and discharge the articles with a predetermined target weight.

SUMMARY

Technical Problem

However, in the article discharge system disclosed in patent document 1 (JP-A No. H6-3182), all the grippers simultaneously grip the articles, so it is necessary to also simultaneously perform a zero correction process on weighers corresponding to each of the grippers. For that reason, there is the concern that the efficiency of the operation of discharging the articles will drop.

It is an object of the present invention to provide an article discharge system that can efficiently perform the operation of discharging articles.

Solution to Problem

An article discharge system pertaining to a first aspect of the invention pulls out and discharges some articles from an article group disposed in a container. The article discharge system includes plural grippers, weight acquisition units, and a control unit. The grippers grip the articles. The weight acquisition units acquire weight values of the articles that each of the plural grippers grips. The control unit causes the plural grippers to grip the some articles from the article group disposed in the container and, based on the result of a combination calculation using the weight values of the articles that each of the plural grippers grips, causes a predetermined combination of the grippers to release and discharge the articles. During the period after the control unit has caused the grippers to release the articles and before the control unit next causes the grippers to grip the articles, the control unit implements a zero correction process on the weight acquisition units corresponding to the grippers that were caused to release the articles.

The article discharge system pertaining to the first aspect can efficiently perform the operation of discharging the articles because it does not need to simultaneously perform the zero correction process on the plural weighers (weight acquisition units) that weigh the weights of the articles to be discharged.

An article discharge system pertaining to a second aspect of the invention is the article discharge system pertaining to the first aspect, wherein in the case of causing predetermined plural combinations of the grippers to release the articles in a predetermined priority ranking based on the result of the combination calculation, the control unit decides the priority ranking based on the number of times the grippers have gripped the articles since the zero correction process was last implemented on the weight acquisition units corresponding to the grippers.

The article discharge system pertaining to the second aspect can preferentially perform the zero correction process on the weighers on which the zero correction process should be preferentially performed, so the weighing accuracy of the weights of the articles to be discharged can be maintained.

An article discharge system pertaining to a third aspect of the invention is the article discharge system pertaining to the first aspect or the second aspect, wherein in the case of causing predetermined plural combinations of the grippers to release the articles in a predetermined priority ranking based on the result of the combination calculation, the control unit decides the priority ranking based on the amount of time that has elapsed since the zero correction process was last implemented on the weight acquisition units corresponding to the grippers.

The article discharge system pertaining to the third aspect can preferentially perform the zero correction process on the weighers on which the zero correction process should be preferentially performed, so the weighing accuracy of the weights of the articles to be discharged can be maintained.

An article discharge system pertaining to a fourth aspect of the invention is the article discharge system pertaining to any one of the first aspect to the third aspect, further including a first discharge unit that has the plural grippers and a second discharge unit that has the plural grippers. The control unit alternately implements a first operation and a second operation. In the first operation, the control unit causes the plural grippers of the first discharge unit to grip the some articles from the article group disposed in the container and, based on the result of the combination calculation, causes a predetermined combination of the grippers to release and discharge the articles. In the second operation, the control unit causes the plural grippers of the second discharge unit to grip the some articles from the article group disposed in the container and, based on the result of the combination calculation, causes a predetermined combination of the grippers to release and discharge the articles.

The article discharge system pertaining to the fourth aspect can efficiently perform the operation of discharging the articles because it includes plural mechanisms for weighing and discharging the articles.

An article discharge system pertaining to a fifth aspect of the invention is the article discharge system pertaining to the fourth aspect, wherein the control unit implements the following steps P1 to P4.

Step P1: In the first operation the control unit causes the plural grippers of the first discharge unit to grip the articles and thereafter moves the container to a position in which the control unit can cause the plural grippers of the second discharge unit to grip the articles.

Step P2: After the completion of the first operation the control unit implements a zero correction process on the weight acquisition units corresponding to the plural grippers of the first discharge unit that were caused to release the articles.

Step P3: In the second operation the control unit causes the plural grippers of the second discharge unit to grip the articles and thereafter moves the container to a position in which the control unit can cause the plural grippers of the first discharge unit to grip the articles.

Step P4: After the completion of the second operation the control unit implements a zero correction process on the weight acquisition units corresponding to the plural grippers of the second discharge unit that were caused to release the articles.

The article discharge system pertaining to the fifth aspect can, in a case where it includes plural mechanisms for weighing and discharging the articles, efficiently perform the zero correction process on the weighers in each mechanism.

Advantageous Effects of Invention

The article discharge system pertaining to the invention can efficiency perform the operation of discharging articles.

BRIEF DESCRIPTION OF THE DRAWINGS

FIG. 6 is a drawing comparatively showing a case where the grippers are arranged in a grid-like manner in the movable member and a case where the grippers are arranged in a staggered manner in the movable member;

FIG. 8E is a general side view of main portions of the article discharge system for describing the operation of the article discharge system of FIG. 1, and illustrates a state in which the grippers have moved to the neighborhood of a chute to discharge the articles;

FIG. 8F is a general side view of main portions of the article discharge system for describing the operation of the article discharge system of FIG. 1, and illustrates a state in which some of the grippers have dropped the articles into the chute;

FIG. 10 is a schematic view of an article discharge system pertaining to the second embodiment of the invention, and illustrates a state in which the placement unit is in the second position;

FIG. 11A is a general side view of main portions of the article discharge system for describing the operation of the article discharge system of FIGS. 9 and 10, and illustrates a state before first grippers grip the articles;

FIG. 11B is a general side view of main portions of the article discharge system for describing the operation of the article discharge system of FIGS. 9 and 10, and illustrates a state in which the gripping members of the first grippers have been inserted into the article group to grip the articles;

FIG. 11C is a general side view of main portions of the article discharge system for describing the operation of the article discharge system of FIGS. 9 and 10, and illustrates a state in which the gripping members of the first grippers that have gripped the articles have moved outside an article group holding container;

FIG. 11D is a general side view of main portions of the article discharge system for describing the operation of the article discharge system of FIGS. 9 and 10, and illustrates a state in which the placement unit has moved to the second position;

FIG. 13A schematically illustrates a state in which one article is being gripped by two grippers in an article discharge system pertaining to example modification G; and FIG. 13B schematically illustrates a state in which the gripping areas of the two grippers are separated by a separation member in the article discharge system pertaining to example modification G.

DETAILED DESCRIPTION

Embodiments of an article discharge system of the invention are described below.

First Embodiment

An article discharge system 100 pertaining to a first embodiment of the invention will now be described.

(1) Overview

Figure 1:
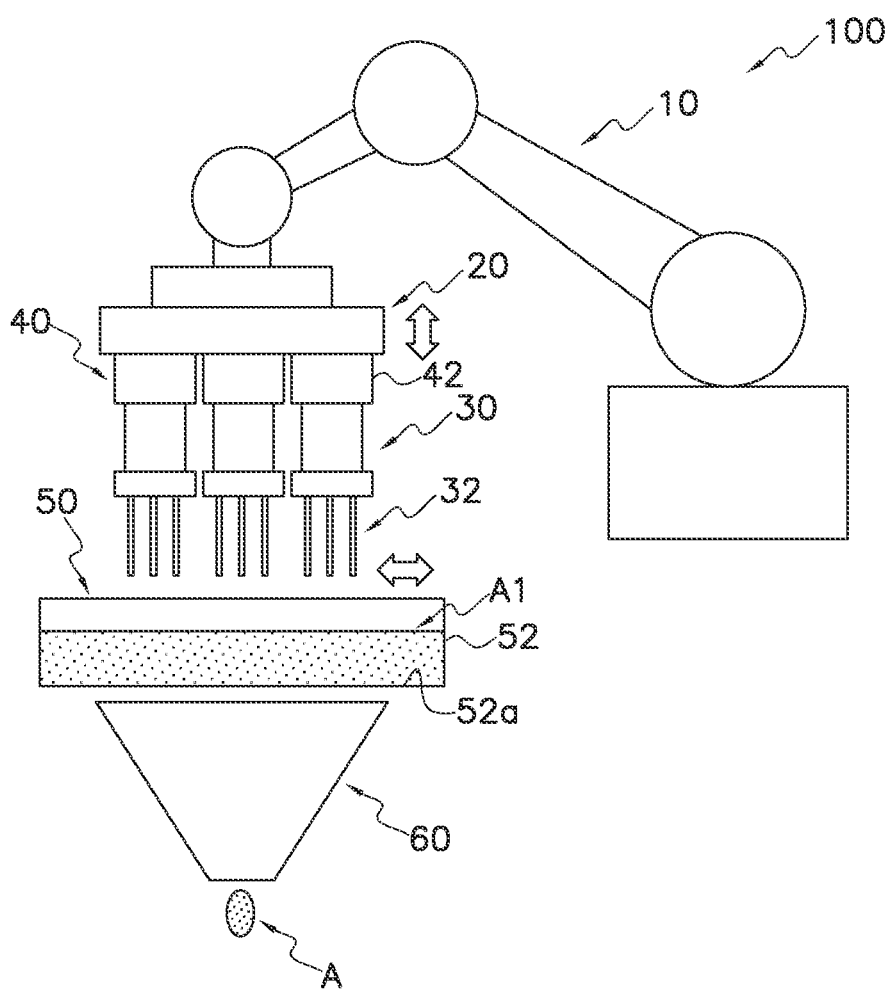
FIG. 1 is a schematic view of an article discharge system pertaining to a first embodiment of the invention.
Figure 2:
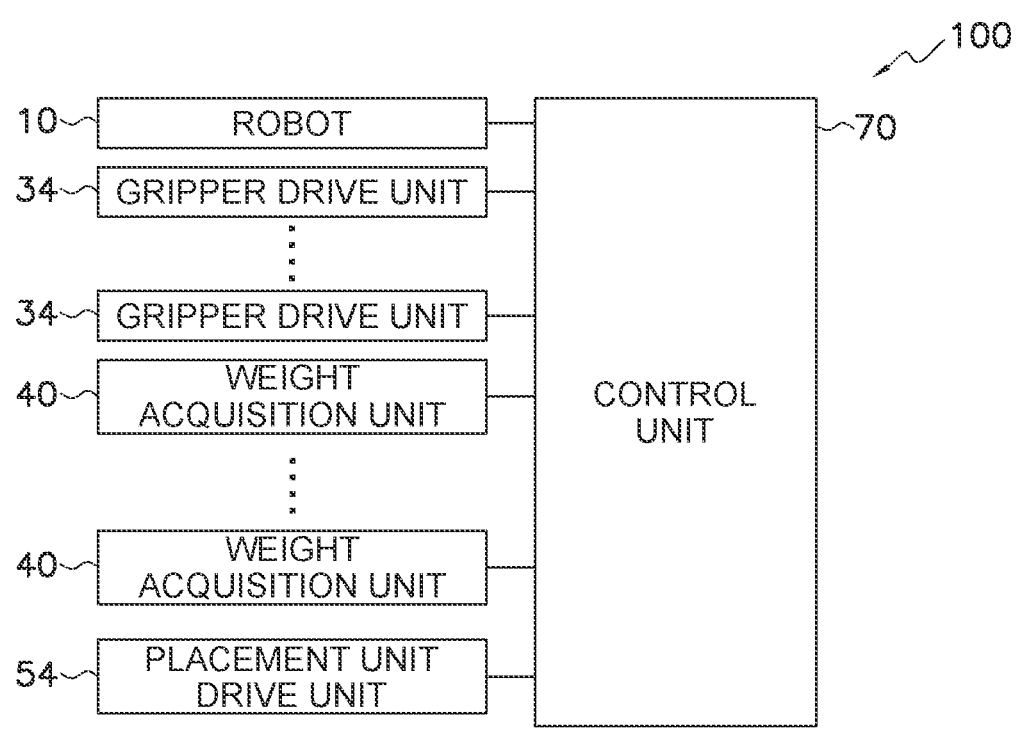
FIG. 2 is a block diagram of the article discharge system of FIG. 1.

An overview of the article discharge system 100 will now be described mainly with reference to FIG. 1 and FIG. 2. FIG. 1 is a schematic view of the article discharge system 100. FIG. 2 is a block diagram of the article discharge system 100.

The article discharge system 100 is a system that pulls out and discharges some articles A from an article group A1 that is a collection of the articles A. Specifically, the article discharge system 100 pulls out some articles A from the article group A1 so that their weight falls within a target weight range and discharges the articles A from the article discharge system 100. Although this is not intended to be limiting, the articles A that are discharged from the article discharge system 100 are packaged in bags or put into containers in a process (not shown in the drawings) after the article discharge system 100 and are shipped as products.

The article discharge system 100 mainly includes a placement unit 50, a placement unit drive unit 54, plural grippers 30, a movable member 20, a robot 10, weight acquisition units 40, a discharge chute 60, and a control unit 70 (see FIG. 1 and FIG. 2). These configurations will now be generally described.

The article group A1 is placed in the placement unit 50. Although this is not intended to be limiting, the articles A are, for example, a food. Furthermore, although this is not intended to be limiting, the articles A are, for example, a sticky food, such as spaghetti noodles or a food that includes many sugars. The placement unit 50 is moved by the placement unit drive unit 54 between a first position in which the grippers 30 can grip the articles A of the article group A1 placed in the placement unit 50 and a second position in which the grippers 30 cannot grip the articles A from the article group A1 placed in the placement unit 50. Each of the grippers 30 has gripping members 32. The grippers 30 grip, with the gripping members 32, the articles A. The plural grippers 30 are attached to the movable member 20. The robot 10 moves the movable member 20 to which the plural grippers 30 are attached. The weight acquisition units 40 acquire weight values of the articles A that each of the grippers 30 grips. The discharge chute 60 receives and discharges the articles A that the grippers 30 have released. The control unit 70 controls the operation of the various configurations of the article discharge system 100, such as the placement unit drive unit 54, gripper drive units 34, and the robot 10, and performs combination calculations utilizing the weight values of the articles A that the weight acquisition units 40 have acquired.

The operation of the article discharge system 100 will now be generally described. The control unit 70 controls the operation of the robot 10 to move the movable member 20 and bring the plural grippers 30 closer to the placement unit 50 that is placed in the first position and in which the article group A1 is placed. The control unit 70 controls the operation of the plural grippers 30 to cause each of the plural grippers 30 to grip some of the articles A of the article group A1 placed in the placement unit 50. The weight acquisition units 40 acquire the weight values of the articles A that each of the grippers 30 grips. The control unit 70 performs a combination calculation based on the weight values of the articles A that each of the grippers 30 grips and which the weight acquisition units 40 have acquired. The combination calculation is a process of adding together the weight values of the articles A that each of the grippers 30 grips to find a combination of weight values whose total value falls within a target weight range. The control unit 70, based on the result of the combination calculation, causes the grippers 30 corresponding to the combination of weight values that fall within the target weight range to release the articles A above the discharge chute 60 and discharge the articles A in the target weight range from the discharge chute 60. Details are described later.

(2) Detailed Configuration

Figure 3:
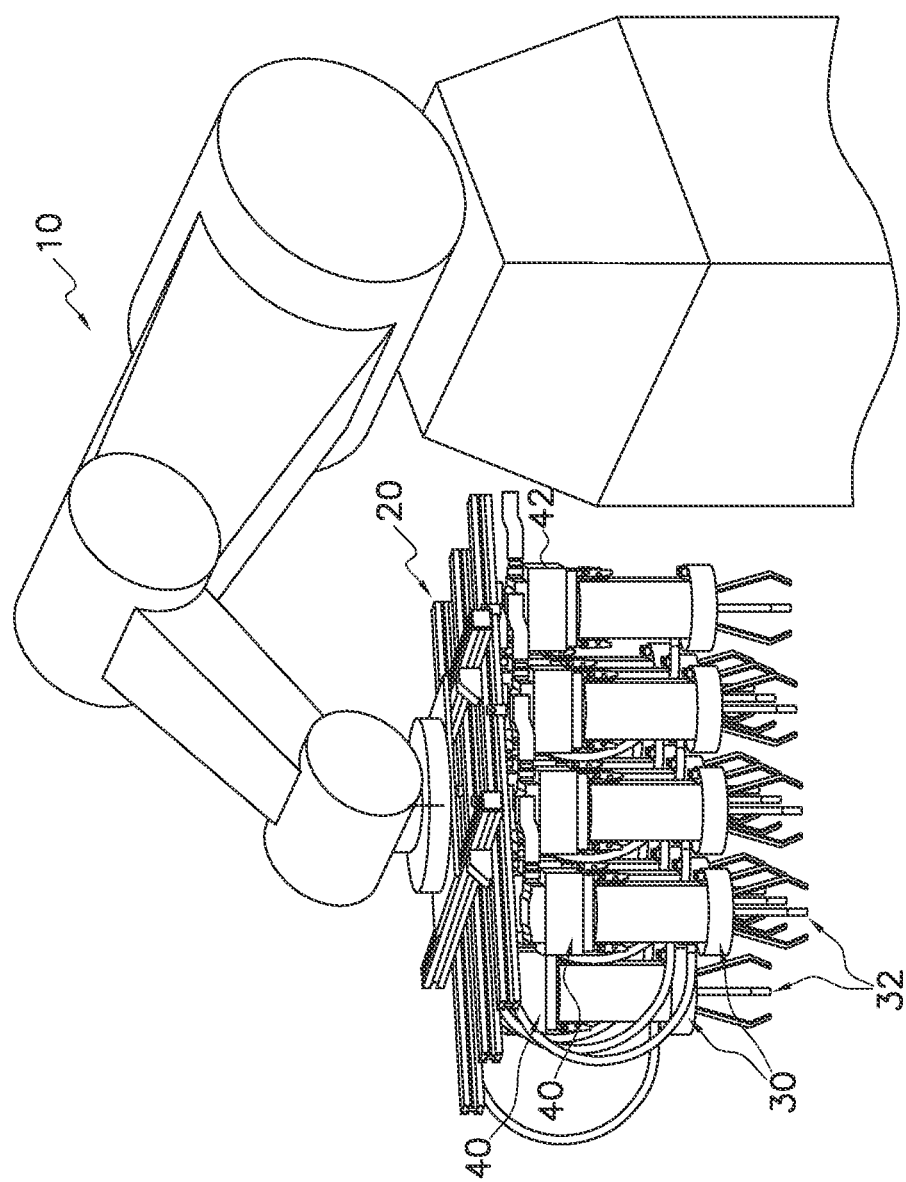
FIG. 3 is a general perspective view of a robot, a movable member, weight acquisition units, and grippers of the article discharge system of FIG. 1.
Figure 4:
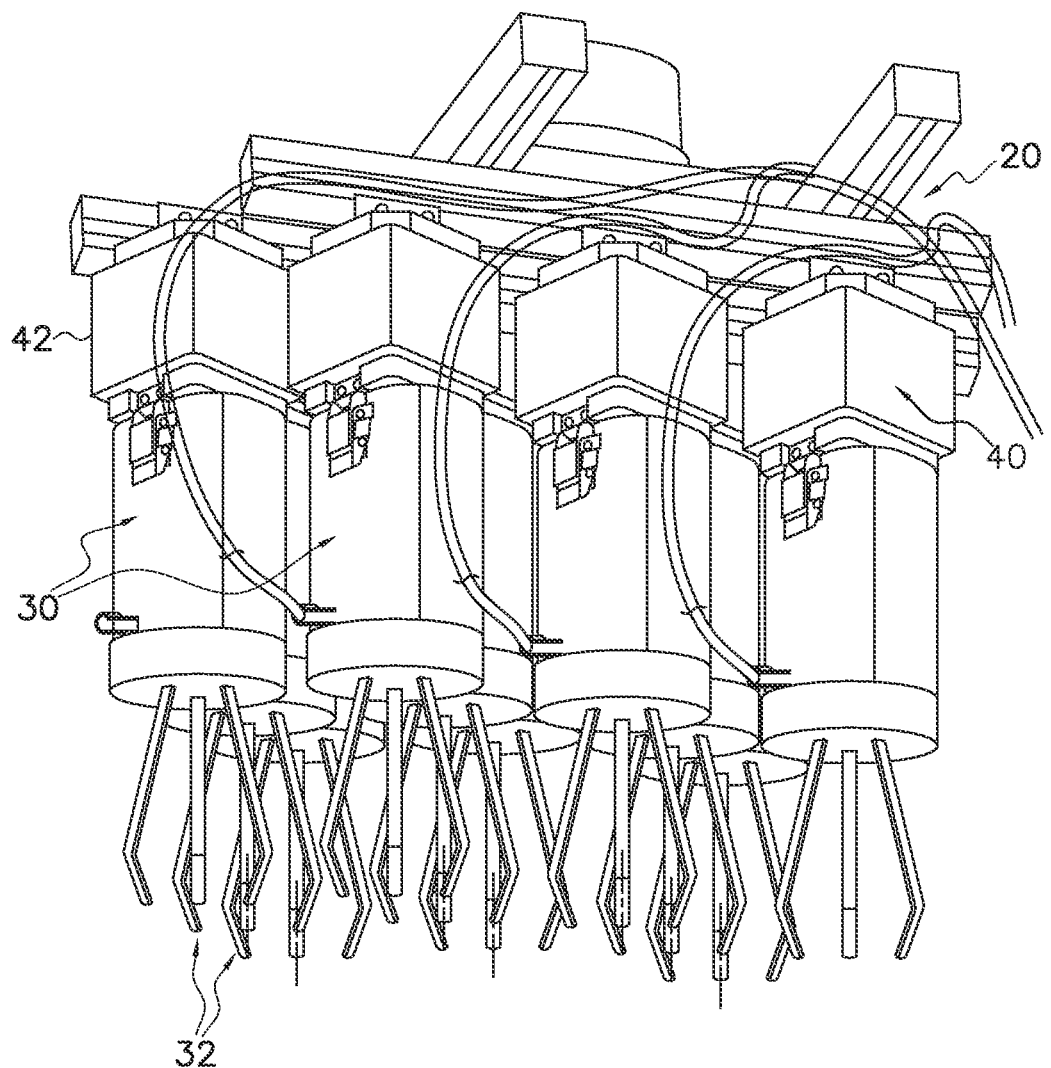
FIG. 4 is a general perspective view of the movable member, the weight acquisition units, and the grippers of the article discharge system of FIG. 1.
Figure 5:
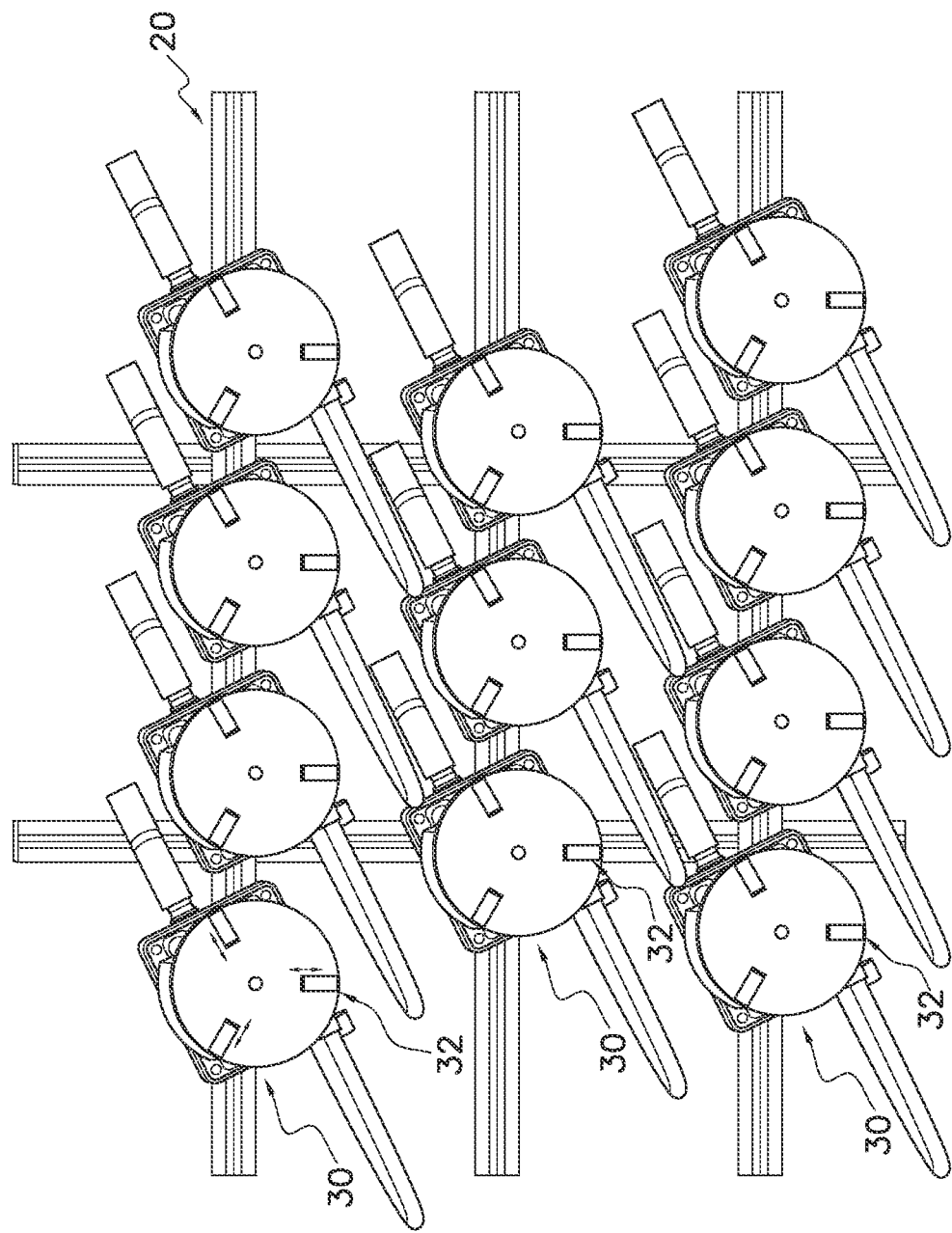
FIG. 5 is a bottom view, seen from a gripping member side of the grippers, of the movable member to which the grippers of the article discharge system of FIG. 1 are attached.

The detailed configuration of the article discharge system 100 will now be described mainly with reference to FIG. 1 to FIG. 5. FIG. 3 is a general perspective view of the robot 10, the movable member 20, the weight acquisition units 40, and the grippers 30. FIG. 4 is a general perspective view of the movable member 20, the weight acquisition units 40, and the grippers 30. FIG. 5 is a bottom view, seen from the gripping member 32 side of the grippers 30 (from below), of the movable member 20 to which the grippers 30 are attached.

(2-1) Movable Member

The movable member 20 is a member to which the plural grippers 30 are attached. The movable member 20 is a frame that supports the plural grippers 30. The movable member 20 is a movable (capable of moving) member that is moved by the robot 10.

It will be noted that, here, the statement "the plural grippers 30 are attached to the movable member 20" does not mean only a configuration where the plural grippers 30 are attached directly to the movable member 20. The statement "the plural grippers 30 are attached to the movable member 20" includes a configuration where the plural grippers 30 are attached via other members to the movable member 20. In the present embodiment, the plural grippers

30 are attached via sensor units 42 of the weight acquisition units 40 to the movable member 20 (see FIG. 4).

(2-2) Robot

The robot 10 is a device that supports the movable member 20 and moves the movable member 20. In the present embodiment, the robot 10 moves the movable member 20 along a single axis. Specifically, the robot 10 moves the movable member 20 up and down along a single axis extending in the vertical direction.

In the present embodiment, the robot 10 is a multi-joint robot such as shown in FIG. 1. However, the type of the robot 10 is not limited to a multi-joint robot. It suffices for the robot 10 to be a device that can move the movable member 20 in a predetermined direction.

Furthermore, in the article discharge system 100, a cylinder that can move the movable member 20 in a predetermined direction may also be used instead of the robot 10. For example, a cylinder that can move the movable member 20 along a single axis may also be used instead of the robot 10.

(2-3) Grippers

The grippers 30 are devices that grip the articles A.

The grippers 30 have the gripping members 32 and the gripper drive units 34. The gripper drive units 34 drive the gripping members 32 using, for example, a motor or fluid pressure as a drive source.

In the present embodiment, the gripping members 32 are rod-like or finger-like members (see FIG. 4). Each of the grippers 30 has a plurality (in FIG. 4, three) of the gripping members 32. It will be noted that the number and the shape of the gripping members 32 illustrated in FIG. 4 and other drawings are merely exemplary and can be appropriately changed. When each of the grippers 30 is viewed from the gripping member 32 side, the plural gripping members 32 are, in the present embodiment, arranged in the circumferential direction (see FIG. 5). In particular, here, when each of the grippers 30 is viewed from the gripping member 32 side, the plural gripping members 32 are arranged in the circumferential direction at approximately equal intervals. When each of the grippers 30 is viewed from the gripping member 32 side, end portions of the gripping members 32 are movable in the radial direction (see FIG. 5). The grippers 30 pinch the articles A between the plural gripping members 32 and grip the articles A as a result of the gripping members 32 being moved, by the gripper drive units 34, inward in the radial direction from a state in which they are away from each other to a state in which they are close to each other. Furthermore, the grippers 30 release the articles A as a result of the gripping members 32 being moved, by the gripper drive units 34, outward in the radial direction from a state in which they are close to each other to a state in which they are away from each other.

The plural grippers 30 are attached to the movable member 20 as in FIG. 3 to FIG. 5. The grippers 30 are each attached, via the sensor units 42 of the weight acquisition units 40, to the movable member 20. In other words, the sensor units 42 of the weight acquisition units 40 are disposed between the grippers 30 and the movable member 20 that supports the grippers 30. Although this is not intended to limit the number of the grippers 30, in the example shown in FIG. 3 to FIG. 5 there are eleven grippers 30 attached to the movable member 20. The plural grippers 30 attached to the movable member 20 integrally move up and down as a result of the robot 10 moving the movable member 20 up and down.

The grippers 30 each have a substantially circular shape when the grippers 30 attached to the movable member 20 are viewed from the gripping member 32 side (see FIG. 5).

Figure 7A:
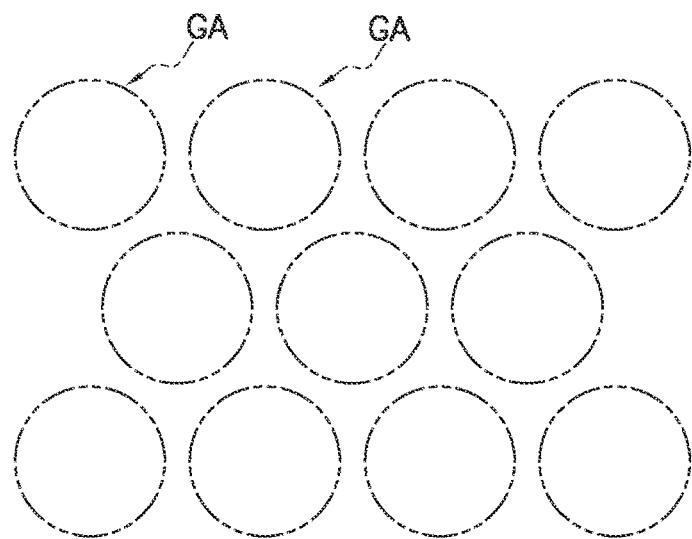
FIG. 7A is a plan view schematically showing an example of an arrangement pattern of gripping areas of the plural grippers.
Figure 7B:
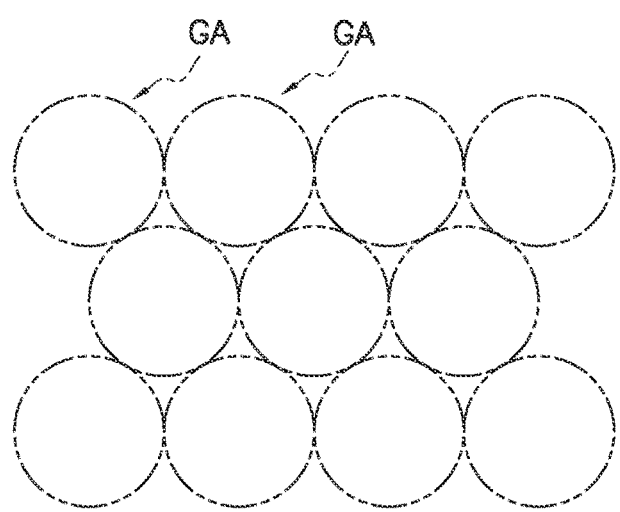
FIG. 7B is a plan view schematically showing another example of an arrangement pattern of the gripping areas of the plural grippers.
Figure 7C:
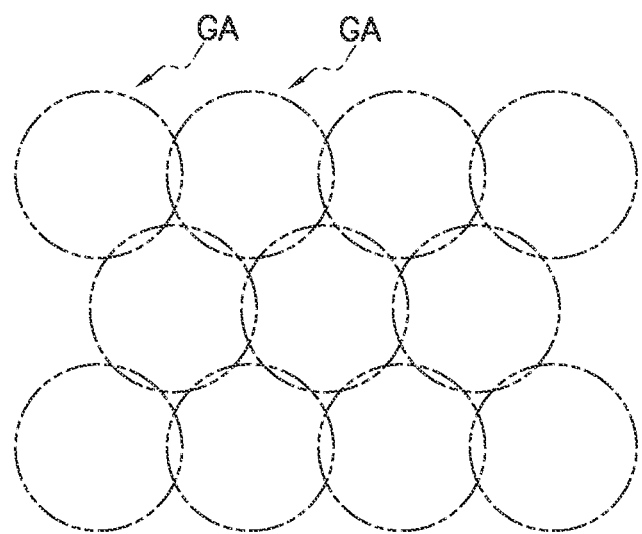
FIG. 7C is a plan view schematically showing another example of an arrangement pattern of the gripping areas of the plural grippers.

Furthermore, in the present embodiment, the grippers 30 each have a substantially circular gripping area GA when the grippers 30 attached to the movable member 20 are viewed from the gripping member 32 side (see FIG. 7A to FIG. 7C). The gripping areas GA are areas in which the gripping members 32 of the grippers 30 can grip the articles A.

Although this is not intended to limit their arrangement, when the plural grippers 30 attached to the movable member 20 are viewed from the gripping member 32 side (in the present embodiment, from below), the plural grippers 30 are arranged in a staggered manner as in FIG. 5. By arranging the grippers 30 in this way, it is easy to arrange a large number of the grippers 30 in a relatively small surface area when the plural grippers 30 attached to the movable member 20 are viewed from the gripping member 32 side. This will be specifically described with reference to FIG. 6.

FIG. 6 illustrates a case where the eleven grippers 30 are arranged in three rows in a grid-like manner and a case where the eleven grippers 30 are arranged in three rows in a staggered manner. In FIG. 6, arrangements of the grippers 30 when the grippers 30 are brought as close to each other as possible (when the grippers 30 are adjacent to each other) are illustrated. As will be understood from FIG. 6, in the case where the grippers 30 are arranged in a staggered manner, the grippers 30 can be arranged more compactly compared to the case where the grippers 30 are arranged in a grid-like manner. In the example of FIG. 6, by changing the arrangement of the grippers 30 from the grid arrangement to the staggered arrangement, the width of the grippers 30 in the direction in which the rows of the grippers 30 are arranged (in FIG. 6, the up and down direction) can be reduced without changing the length of the arrangement of the grippers 30 in the direction in which the grippers 30 are arranged in each row (in FIG. 6, the right and left direction).

Furthermore, it is preferred that the plural grippers 30 be attached to the movable member 20 in such a way that, as in FIG. 7A, the gripping areas GA in which each of the grippers 30 can grip the articles A in the placement unit 50 are in proximity to a gripping area GA in which at least one other gripper 30 can grip the articles A in the placement unit 50. It will be noted that FIG. 7A illustrates the gripping areas GA in which each of the grippers 30 can grip the articles A in the placement unit 50 when the placement unit 50 is viewed from above.

More preferably, to the extent that the gripping members 32 of adjacent grippers 30 do not interfere with each other, the plural grippers 30 are attached to the movable member 20 in such a way that, as in FIG. 7B, the gripping areas GA in which each of the grippers 30 can grip the articles A in the placement unit 50 are contiguous with a gripping area GA in which at least one other gripper 30 can grip the articles A in the placement unit 50. Furthermore, to the extent that the gripping members 32 of adjacent grippers 30 do not interfere with each other, the plural grippers 30 may also be attached to the movable member 20 in such a way that, as in FIG. 7C, the gripping areas GA in which each of the grippers 30 can grip the articles A in the placement unit 50 partially overlap a gripping area GA in which at least one other gripper 30 can grip the articles A in the placement unit 50.

(2-4) Weight Acquisition Units

In the article discharge system 100, one weight acquisition unit 40 is provided with respect to each of the grippers 30. The weight acquisition units 40 are an example of weight acquisition units and measure the weights of the articles A that the corresponding grippers 30 grip.

Each weight acquisition unit 40 mainly includes a sensor unit 42 and a control unit that is not shown in the drawings.

Each of the grippers 30 are attached via the sensor units 42 to the movable member 20 as in FIG. 4. The sensor units 42 include a force sensor and an acceleration sensor, though these are not shown in the drawings. Although this is not intended to limit the types of the sensors, the force sensor is, for example, a strain gauge load cell. The acceleration sensor is, for example, a strain gauge load cell or a MEMS small acceleration sensor.

The control units of the weight acquisition units 40 acquire the masses of the articles A that the grippers 30 are gripping based on the force and the acceleration measured by the sensor units 42 when the grippers 30 that have gripped the articles A are moved in accompaniment with the movement of the movable member 20. Specifically, the control units of the weight acquisition units 40 acquire the masses of the articles A that the grippers 30 are gripping by dividing the force measured by the force sensor by the acceleration measured by the acceleration sensor.

It will be noted that the weight acquisition units are not limited to the weight acquisition units 40 that acquire the masses of the articles A based on the force and the acceleration that are measured when the grippers 30 move. The weight acquisition units may also be units that use load cells or the like to acquire the weights of the articles A that the grippers 30 in a stationary state are gripping.

(2-5) Placement Unit and Placement Unit Drive Unit

The article group A1 is placed in the placement unit 50.

Specifically, the placement unit 50 includes an article group holding container 52. The articles A (the article group A1) are held in the article group holding container 52. In the placement unit 50, the article group A1 is placed on a placement surface 52a (here, the bottom surface of the article group holding container 52). The grippers 30 grip some of the articles A from the article group A1 held in the article group holding container 52. In the present embodiment, the article group holding container 52 is a cuboidal container with an open top. In the present embodiment, the placement unit 50 is configured in such a way that, when the quantity of the articles A held inside the article group holding container 52 decreases, a person or a machine can replace the article group holding container 52 in which the quantity of the articles A inside has decreased with an article group holding container 52 that is new (that is holding many articles A). It will be noted that instead of being configured in such a way that the article group holding container 52 can be replaced, the placement unit 50 may also have an article supply mechanism for supplying the articles A to the article group holding container 52.

The placement unit 50 is moved between a first position and a second position by the placement unit drive unit 54. The placement unit drive unit 54 moves the placement unit 50 using, for example, a motor or fluid pressure as a drive source. The first position is a position in which the grippers 30 can grip the articles A of the article group A1 placed in the placement unit 50. The second position is a position in which the grippers 30 cannot grip the articles A from the article group A1 placed in the placement unit 50. The placement unit drive unit 54 moves the placement unit 50 in a direction intersecting the moving direction of the movable member 20 between the first position and the second position. In other words, the placement unit drive unit 54 moves the placement unit 50 in a direction intersecting the vertical direction between the first position and the second position. Although this is not intended to be limiting, in the present embodiment, the placement unit drive unit 54 moves the placement unit 50 in the horizontal direction between the first position and the second position.

The first position of the placement unit 50 specifically is a position directly under the grippers 30. When the placement unit 50 is in the first position, the grippers 30 can grip the articles A placed in the placement unit 50 when the movable member 20 is moved by the robot 10 so that the grippers 30 are brought closer to a predetermined position with respect to the placement unit 50. Furthermore, the first position of the placement unit 50 is a position directly above the discharge chute 60.

The second position of the placement unit 50 is a position away from directly under the grippers 30. In the present embodiment, the movable member 20 to which the grippers 30 are attached moves only in the vertical direction, so when the placement unit 50 is in the second position, the grippers 30 cannot grip the articles A placed in the placement unit 50. Furthermore, the second position of the placement unit 50 is a position away from directly above the discharge chute 60.

(2-6) Discharge Chute

The discharge chute 60 is a funnel-shaped member. The discharge chute 60 is disposed directly under the grippers 30. Furthermore, the discharge chute 60 is disposed directly under the placement unit 50 when the placement unit 50 is positioned in the first position. In other words, the placement unit 50 positioned in the first position is disposed between the grippers 30 and the discharge chute 60. When the placement unit 50 is positioned in the second position, the placement unit 50 is not disposed between the grippers 30 and the discharge chute 60.

The discharge chute 60 discharges, to the outside of the article discharge system 100, the articles A supplied from the grippers 30 as a result of the grippers 30 releasing the articles A. Specifically, when the placement unit 50 is positioned in the second position, the discharge chute 60 receives, and discharges to the outside of the article discharge system 100, the articles A that the grippers 30 drop therein by releasing the articles A.

(2-7) Control Unit

The control unit 70 has a CPU and memories such as a ROM and a RAM (not shown in the drawings). The control unit 70 is electrically connected to the robot 10, the gripper drive units 34, the weight acquisition units 40, and the placement unit drive unit 54 (see FIG. 2). The control unit 70, as a result of the CPU executing a program stored in the memory, controls the operation of the various configurations of the article discharge system 100, such as the robot 10, the gripper drive units 34, and the placement unit drive unit 54, and performs combination calculations utilizing the weight values of the articles A that the weight acquisition units 40 have acquired. It will be noted that the various functions of the control unit 70 are not limited to a case where they are realized by software and may also be realized by hardware or by hardware and software working together.

(3) Operation of Article Discharge System

The operation of the article discharge system 100 controlled by the control unit 70 will now be described with reference to FIG. 8A to FIG. 8G. It will be noted that FIG. 8A to FIG. 8G are general side views of main portions of the article discharge system for describing the operation of the article discharge system 100 of FIG. 1. In FIG. 8A to FIG. 8G, illustration of the robot 10 that moves the movable member 20 is omitted.

Figure 8A:
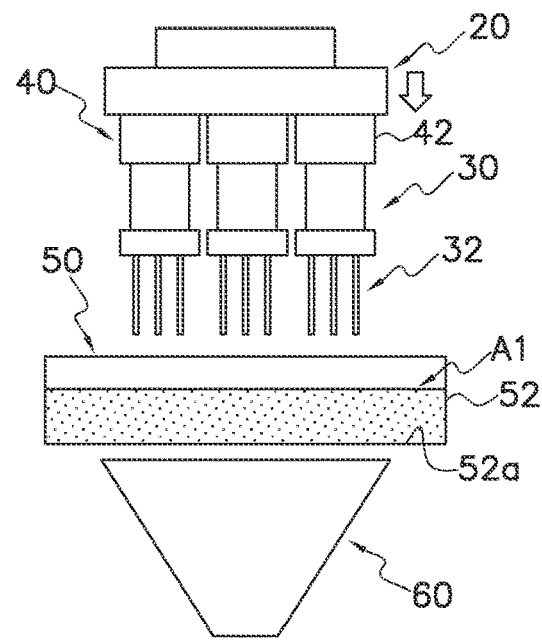
FIG. 8A is a general side view of main portions of the article discharge system for describing the operation of the article discharge system of FIG. 1, and illustrates a state (an initial state) before the grippers grip articles.

FIG. 8A illustrates an initial state before the grippers 30 grip the articles A. To briefly describe the states of the various devices in the initial state, the movable member 20 is disposed in a predetermined position so that the gripping members 32 of the grippers 30 are disposed outside the article group holding container 52 of the placement unit 50.

The placement unit 50 is disposed in the first position directly under the grippers 30.

During the operation of the article discharge system 100, the control unit 70 controls the robot 10 to move the movable member 20 vertically downward from the initial state and bring the plural grippers 30 closer to the placement unit 50. Specifically, the control unit 70 controls the operation of the robot 10 to move the movable member 20 vertically downward so that the gripping members 32 of the grippers 30 are disposed in the predetermined position in which they can grip the articles A in the article group holding container 52 (see FIG. 8B). More specifically, the control unit 70 controls the operation of the robot 10 to move the movable member 20 vertically downward so that the gripping members 32 become inserted into the article group A1. Thereafter, the control unit 70 controls the gripper drive units 34 of the grippers 30 to cause the gripping members 32 to grip the articles A.

Preferably, the control unit 70 causes the plural grippers 30 to grip the articles A simultaneously. However, the control unit 70 is not limited to this and may also cause the plural grippers 30 to grip the articles A at different timings.

Figure 8B:
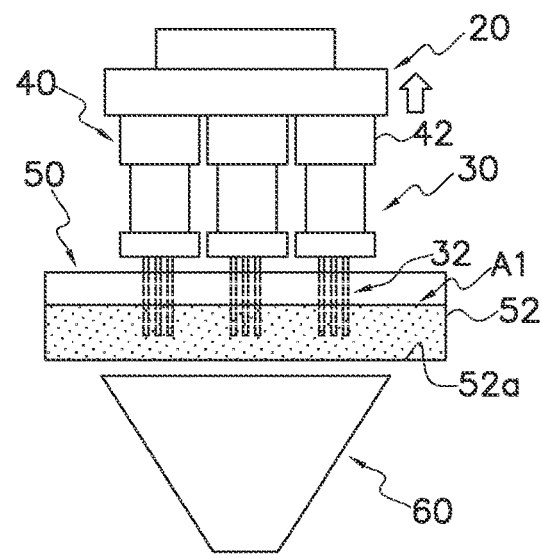
FIG. 8B is a general side view of main portions of the article discharge system for describing the operation of the article discharge system of FIG. 1, and illustrates a state in which the gripping members of the grippers have been inserted into an article group to grip the articles.
Figure 8C:
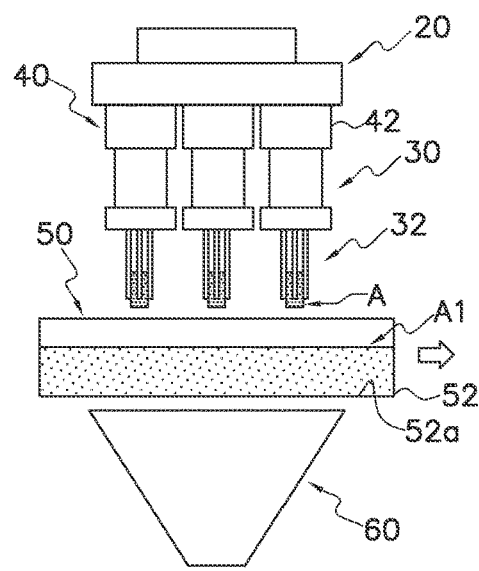
FIG. 8C is a general side view of main portions of the article discharge system for describing the operation of the article discharge system of FIG. 1, and illustrates a state in which the gripping members of the grippers that have gripped the articles have moved outside an article group holding container.

Next, in a state in which the plural grippers 30 have gripped the articles A, the control unit 70 controls the robot 10 to move the movable member 20 vertically upward so that the gripping members 32 of the grippers 30 are disposed outside the article group holding container 52 of the placement unit 50 (see FIG. 8C).

Figure 8D:
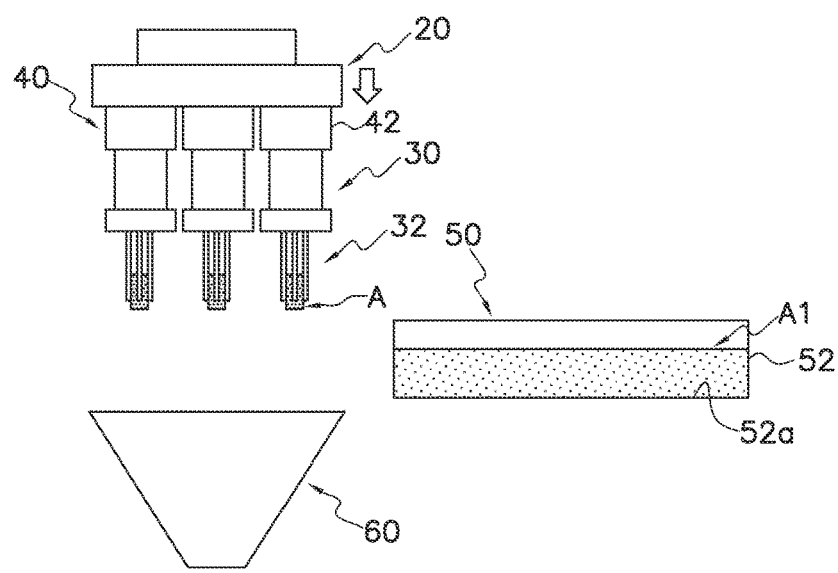
FIG. 8D is a general side view of main portions of the article discharge system for describing the operation of the article discharge system of FIG. 1, and illustrates a state in which a placement unit has moved to a second position.
Figure 8G:
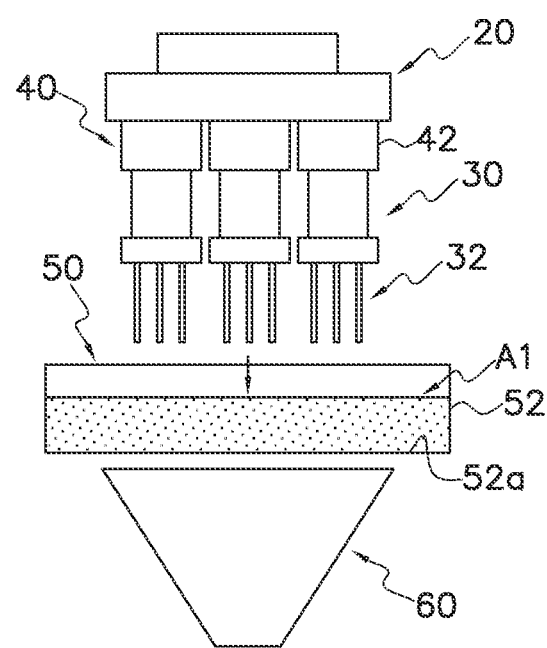
FIG. 8G is a general side view of main portions of the article discharge system for describing the operation of the article discharge system of FIG. 1, and illustrates a state in which a gripper corresponding to a weight value that was not selected for a combination has dropped the articles into the article group holding container.

Next, the control unit 70 controls the placement unit drive unit 54 to move the placement unit 50 from the first position to the second position (see FIG. 8D). When the placement unit 50 moves to the second position, the placement unit 50 is no longer disposed between the grippers 30 and the discharge chute 60.

Next, the control unit 70 controls the robot 10 to move the movable member 20 vertically downward and bring the plural grippers 30 closer to the discharge chute 60 (see FIG. 8E). When the robot 10 moves the movable member 20 vertically downward, each of the weight acquisition units 40 acquires the weights of the articles A that the corresponding grippers 30 grip. The control unit 70 performs a combination calculation using the weight values of the articles A that each of the grippers 30 grips and which each of the weight acquisition units 40 has acquired and finds a combination of weight values whose total value falls within the target weight range.

When the combination calculation ends, the control unit 70, based on the result of the combination calculation, causes the grippers 30 corresponding to the combination of weight values falling within the target weight range to release the articles A above the discharge chute 60 and discharge the articles A from the discharge chute 60 (see FIG. 8F). In a case where there is more than one combination of weight values falling within the target weight range, the control unit 70 executes the discharge of the articles A from the discharge chute 60 plural times. At this time, the control unit 70 implements a zero correction process at a predetermined timing with respect to the weight acquisition units 40 corresponding to the grippers 30 that were caused to release the articles A in order to discharge the articles A from the discharge chute 60. The zero correction process is a process performed in order to eliminate or mitigate the effect of zero drift from which the weight acquisition units 40 suffer. Zero drift is a phenomenon where, for example, reference points (zero points) of the output values of the sensor units 42 of the weight acquisition units 40 gradually change over a relatively long time due to changes in the environment, such as temperature and humidity, and deterioration of the parts of the sensor units 42 over time. The zero correction process is performed in order to maintain, in a predetermined range, the weighing accuracy of the weight values of the articles A weighed by the weight acquisition units 40. The timing when the zero correction process is implemented is the timeframe of a period after the control unit 70 has caused the grippers 30 corresponding to the subject weight acquisition units 40 to release the articles A and before the control unit 70 next causes the same grippers 30 to grip the articles A. In other words, the zero correction process is implemented with respect to the corresponding weight acquisition units 40 during a standby time in which the grippers 30 are not gripping the articles A.

When the discharge of the articles A ends with respect to all combinations of weight values falling within the target weight range, the control unit 70 controls the robot 10 to return the movable member 20 to the same position as the position illustrated in FIG. 8A. Furthermore, the control unit 70 controls the placement unit drive unit 54 to return the placement unit 50 from the second position to the first position directly under the grippers 30 (see FIG. 8G). Moreover, if there are grippers 30 that are still gripping the articles A (in other words, the grippers 30 gripping the articles A whose weights were not selected for a combination), the control unit 70 controls the gripper drive units 34 to cause those grippers 30 to release the articles A. As a result, the articles A that the grippers 30 had been gripping drop into the placement unit 50 disposed in the first position and are reutilized as the articles A of the article group A1.

The article discharge system 100 repeatedly performs the above operations.

It will be noted that the operations of the article discharge system 100 described here are merely an example and can be appropriately changed to the extent that they are not incompatible.

For example, in the above description, each of the weight acquisition units 40 acquire, at the timing when the movable member 20 is moved vertically downward, the weights of the articles A that the grippers 30 grip. Instead of this, each of the weight acquisition units 40 may acquire, at the timing when the movable member 20 is moved vertically upward, the weights of the articles A that the corresponding grippers 30 grip.

Furthermore, for example, when controlling the robot 10 to move the movable member 20 upward in a state in which the plural grippers 30 have gripped the articles A (when changing the position of the movable member 20 from the position illustrated in FIG. 8B to the position illustrated in FIG. 8C), the control unit 70 may control the robot 10 to move the movable member 20 downward one or more times before moving the placement unit 50 from the first position to the second position. Specifically, the control unit 70 may control the robot 10 to move the movable member 20 upward and thereafter move the movable member 20 a predetermined distance downward one time before moving the placement unit 50 from the first position to the second position. Furthermore, for example, the control unit 70 may control the robot 10 to move the movable member 20 upward and thereafter reciprocally move the movable member 20 in upward and downward directions before moving the placement unit 50 from the first position to the second position. Such operations of the movable member 20 can shake off articles sticking to the gripping members 32. Articles sticking to the gripping members 32 are articles that are not gripped by the gripping members 32 and for which there is the concern that they will drop regardless of the operation of the gripping members 32. By moving the movable member 20 downward to shake off beforehand articles sticking to the gripping members 32, the weights of the articles A that the weight acquisition units 40 acquire can be brought closer to the weights of the articles A that the gripping members 32 are gripping to thereby improve weighing accuracy.

Furthermore, in a case where there is more than one combination of weight values falling within the target weight range in the combination calculation, the control unit 70 executes the discharge of the articles A from the discharge chute 60 plural times. Specifically, the control unit 70 discharges the articles A plural times from the discharge chute 60 by performing, plural times, the operation of causing predetermined combinations of the grippers 30 to release the articles A. In this case, the control unit 70 may also cause plural combinations of the grippers 30 to release the articles A in a predetermined priority ranking based on the result of the combination calculation. That is, the control unit 70 may prioritize and perform the release of the articles A by a certain combination of grippers 30 over the release of the articles A by another combination of grippers 30. Because of this, the control unit 70 can give a longer standby time (time in which the articles A are not being gripped) to the grippers 30 whose release of the articles A was more preferential, so an opportunity to implement the zero correction process on the corresponding weight acquisition units 40 can be sufficiently ensured. Consequently, the control unit 70 can preferentially perform the zero correction process on the weight acquisition units 40 on which the zero correction process should be preferentially performed, so the weighing accuracy of the weight values of the articles A to be discharged can be maintained.

The control unit 70 may also decide the predetermined priority ranking based on various criteria. For example, the predetermined priority ranking may also be decided based on the number of times (the number of post-correction grips) the grippers 30 have gripped the articles A since the zero correction process was last (most recently) implemented on the weight acquisition units 40 corresponding to those grippers 30. In this case, for example, the greater the sum total of the number of post-correction grips is among all the grippers 30 included in a certain combination of the grippers 30, the control unit 70 may assign a higher priority ranking to that combination of the grippers 30. Furthermore, for example, the greater the number of post-correction grips of a certain gripper 30 is, the control unit 70 may assign a higher priority ranking to the combination of the grippers 30 that includes that gripper 30. Because of this control, the control unit 70 can sufficiently ensure an opportunity to implement the zero correction process on the weight acquisition units 40 corresponding to the grippers 30 that have a large number of post-correction grips.

Furthermore, the predetermined priority ranking may also be decided based on the amount of time that has elapsed (post-correction elapsed time) since the zero correction process was last implemented on the weight acquisition units 40 corresponding to the grippers 30. In this case, for example, the longer the sum total of the post-correction elapsed times is among all the grippers 30 included in a certain combination of the grippers 30, the control unit 70 may assign a higher priority ranking to that combination of the grippers 30. Furthermore, for example, the longer the post-correction elapsed time of a certain gripper 30 is, the control unit 70 may assign a higher priority ranking to the combination of the grippers 30 that includes that gripper 30. Because of this control, the control unit 70 can sufficiently ensure an opportunity to implement the zero correction process on the weight acquisition units 40 corresponding to the grippers 30 that have long post-correction elapsed times.

Two examples of methods for deciding the priority ranking for causing plural combinations of the grippers 30 to release the articles A have been described above, but these methods may also be combined with each other to decide the priority ranking, and these methods may also be combined with another method to decide the priority ranking.

(4) Characteristics (4-1)

The article discharge system 100 of the present embodiment pulls out and discharges some articles A from the article group A1. The article discharge system 100 includes the placement unit 50, the plural grippers 30, the movable member 20, the robot 10, the weight acquisition units 40, and the control unit 70. The article group A1 is placed in the placement unit 50. The plural grippers 30 grip, with the gripping members 32, the articles A. The plural grippers 30 are attached to the movable member 20. The robot 10 moves the movable member 20. The weight acquisition units 40 acquire weight values of the articles A that each of the grippers 30 grips. The control unit 70 moves the movable member 20, brings the plural grippers 30 closer to the placement unit 50, causes the plural grippers 30 to grip the some articles A of the article group A1 placed in the placement unit 50, and, based on the result of a combination calculation using the weight values of the articles A that each of the grippers 30 grips and which the weight acquisition units 40 have acquired, causes predetermined grippers 30 to release and discharge the articles A.

In the article discharge system 100 of the present embodiment, the control unit 70 implements the zero correction process at a predetermined timing with respect to the weight acquisition units 40 corresponding to the grippers 30 that were caused to release the articles A to discharge the articles A. The predetermined timing is the timeframe of a period after the control unit 70 has caused the grippers 30 corresponding to the subject weight acquisition units 40 to release the articles A and before the control unit 70 next causes the same grippers 30 to grip the articles A. For that reason, the article discharge system 100 does not need to simultaneously perform the zero correction process on all the weight acquisition units 40 after causing all the grippers 30 to release the articles A. In the case of simultaneously performing the zero correction process on all the weight acquisition units 40, it is necessary to ensure a timeframe for implementing the zero correction process, so the amount of time for the series of operations in which the article discharge system 100 discharges the articles A becomes longer by that amount. In a case where the article discharge system 100 executes the operation of discharging the articles A from the discharge chute 60 plural times as described above, the article discharge system 100 can, for example, perform just the zero correction process on the weight acquisition units 40 corresponding to the grippers 30 that first discharged the articles A. For that reason, the article discharge system 100 does not need to ensure a timeframe for simultaneously performing the zero correction process on all the weight acquisition units 40 in the series of operations shown in FIG. 8A to FIG. 8G. Consequently, the article discharge system 100 can efficiently perform the operation of discharging the articles A.

(4-2)

In the article discharge system 100 of the present embodiment, in a case where the control unit 70 executes the operation of discharging the articles A from the discharge chute 60 plural times, the control unit 70 can cause plural combinations of the grippers 30 to release the articles A in the predetermined priority ranking. For that reason, the article discharge system 100 can perform the zero correction process preferentially with respect to the weight acquisition units 40 on which the zero correction process should be preferentially performed, so the weighing accuracy of the weights of the articles A to be discharged can be maintained.

Second Embodiment

Figure 9:
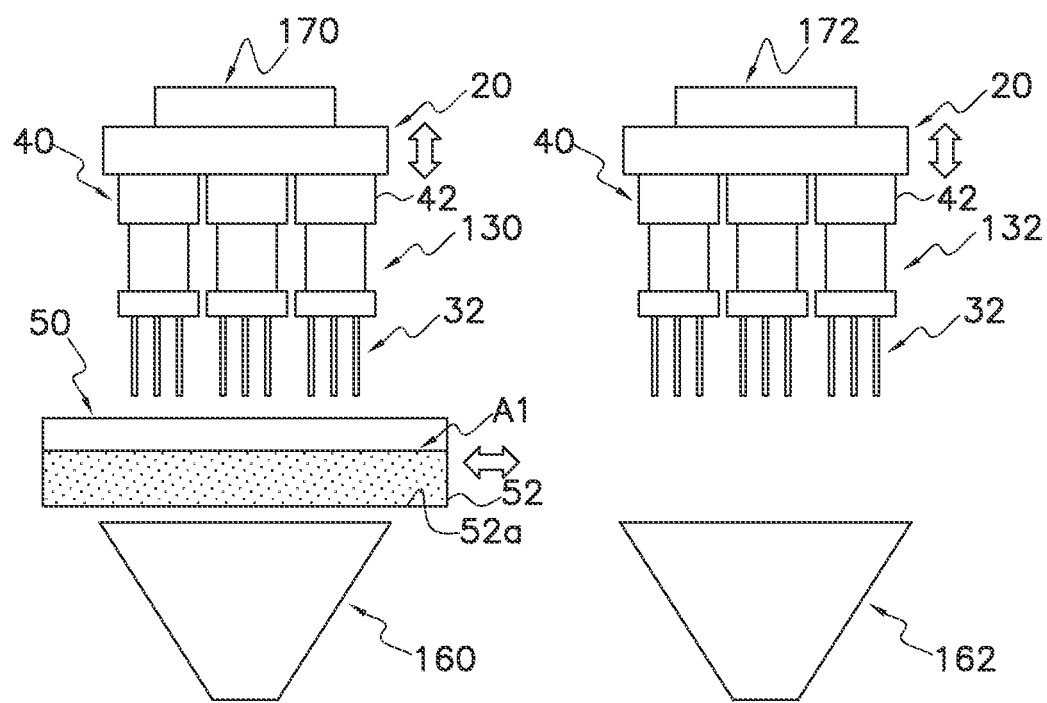
FIG. 9 is a schematic view of an article discharge system pertaining to a second embodiment of the invention, and illustrates a state in which the placement unit is in a first position.

An article discharge system 200 pertaining to a second embodiment of the invention will now be described mainly with reference to FIG. 9 and FIG. 10. FIG. 9 and FIG. 10 are schematic views of the article discharge system 200. In FIG. 9 and FIG. 10, configurations that are the same as those of the article discharge system 100 of the first embodiment are assigned the same reference signs as those of the first embodiment.

(1) Configuration

The article discharge system 200 includes a first discharge unit 170 and a second discharge unit 172. Each of the discharge units 170, 172 comprises plural grippers 130, 132, a movable member 20, a robot 10, weight acquisition units 40, and a discharge chute 160, 162, respectively. Hereinafter, as needed, the grippers 130 and the discharge chute 160 of the first discharge unit 170 will be called the first grippers 130 and the first discharge chute 160, respectively, and the grippers 132 and the discharge chute 162 of the second discharge unit 172 will be called the second grippers 132 and the second discharge chute 162, respectively. The first discharge chute 160 is disposed under the first grippers 130. The second discharge chute 162 is disposed under the second grippers 132. To avoid redundant description, here, mainly the differences between the article discharge system 200 and the article discharge system 100 are described, and unless it is particularly necessary, description of points of agreement is omitted.

It will be noted that, here, a case where each of the discharge units 170, 172 has three grippers 130, 132 is described as an example to simplify the description. However, the number of the grippers 130, 132 is not limited to three. Each of the discharge units 170, 172 may also have more of the grippers 130, 132.

Furthermore, the article discharge system 200 includes a placement unit 50, a placement unit drive unit 54, and a control unit 70. As in the first embodiment, the placement unit 50 is moved between a first position and a second position by the placement unit drive unit 54. The first position, as shown in FIG. 9, is a position in which the first grippers 130 can grip the articles A of the article group A1 placed in the placement unit 50 and in which the second grippers 132 cannot grip the articles A from the article group A1 placed in the placement unit 50. The second position, as shown in FIG. 10, is a position in which the first grippers 130 cannot grip the articles A of the article group A1 placed in the placement unit 50 and in which the second grippers 132 can grip the articles A from the article group A1 placed in the placement unit 50.

The control unit 70 of the article discharge system 200 alternately implements a first operation and a second operation. The first operation is an operation in which the first grippers 130 grip the articles A from the article group A1 placed in the placement unit 50 located in the first position and discharge the articles A from the first discharge chute 160. The second operation is an operation in which the second grippers 132 grip the articles A from the article group A1 placed in the placement unit 50 located in the second position and discharge the articles A from the second discharge chute 162. When implementing the first operation, the control unit 70 causes a predetermined combination of the grippers 130 to release the articles A and discharge the articles A based on the result of a combination calculation using the weight values of the articles A that each of the first grippers 130 grips. When implementing the second operation, the control unit 70 causes a predetermined combination of the grippers 132 to release the articles A and discharge the articles A based on the result of a combination calculation using the weight values of the articles A that each of the second grippers 132 grips. After the completion of the first operation, the control unit 70 controls the placement unit drive unit 54 to move the placement unit 50 from the first position to the second position. After the completion of the second operation, the control unit 70 controls the placement unit drive unit 54 to move the placement unit 50 from the second position to the first position. Because of this, the control unit 70 can repeatedly alternately execute the first operation and the second operation. The article discharge system 200 can efficiently perform the operation of discharging the articles A because it includes mechanisms that alternately discharge, with the two discharge units 170, 172, the articles A.

(2) Operation

Details about the operation of the article discharge system 200 controlled by the control unit 70 will now be described with reference to FIG. 11A to FIG. 11L. It will be noted that FIG. 11A to FIG. 11L are general side view of main portions of the article discharge system for describing the operation of the article discharge system 200. In FIG. 11A to FIG. 11L, illustration of the robots 10 of each of the discharge units 170, 172 is omitted. FIG. 11A to FIG. 11F, which relate to the operation in which the first discharge unit 170 discharges the articles A, illustrate substantially the same operations as those shown in FIG. 8A to FIG. 8F of the first embodiment. FIG. 11G to FIG. 11L, which relate to the operation in which the second discharge unit 172 discharge the articles A, illustrate substantially the same operations as those shown in FIG. 8A to FIG. 8F. For that reason, details about the operations in each of FIG. 11A to FIG. 11L are as described in the first embodiment.

In the present embodiment, the control unit 70 alternately implements the first operation and the second operation by sequentially repeatedly performing the following first step to tenth step.

First Step: The control unit 70 starts the first operation. Specifically, the control unit 70 causes the first grippers 130 to grip the articles A from the article group A1 placed in the placement unit 50 located in the first position. (FIG. 11A to FIG. 11C)

Second Step: The control unit 70 moves the placement unit 50 from the first position to the second position. (FIG. 11D)

Third Step: The control unit 70 acquires the weight values of the articles A that each of the first grippers 130 grips and performs a combination calculation using the acquired weight values.

Figure 11E:
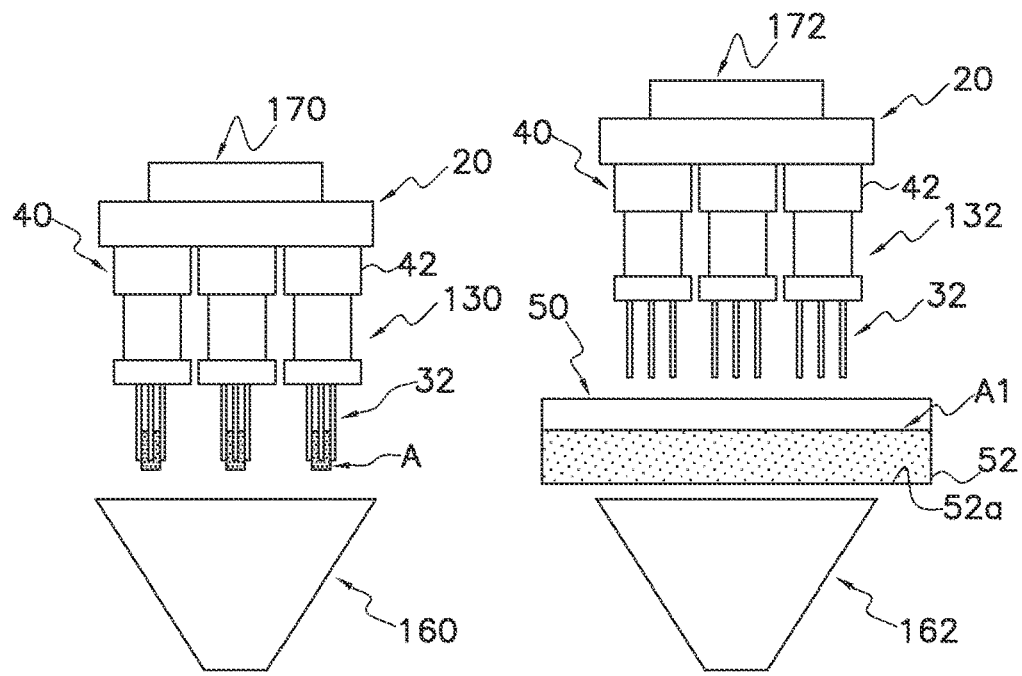
FIG. 11E is a general side view of main portions of the article discharge system for describing the operation of the article discharge system of FIGS. 9 and 10, and illustrates a state in which the first grippers have moved to the neighborhood of a first discharge chute to discharge the articles.
Figure 11F:
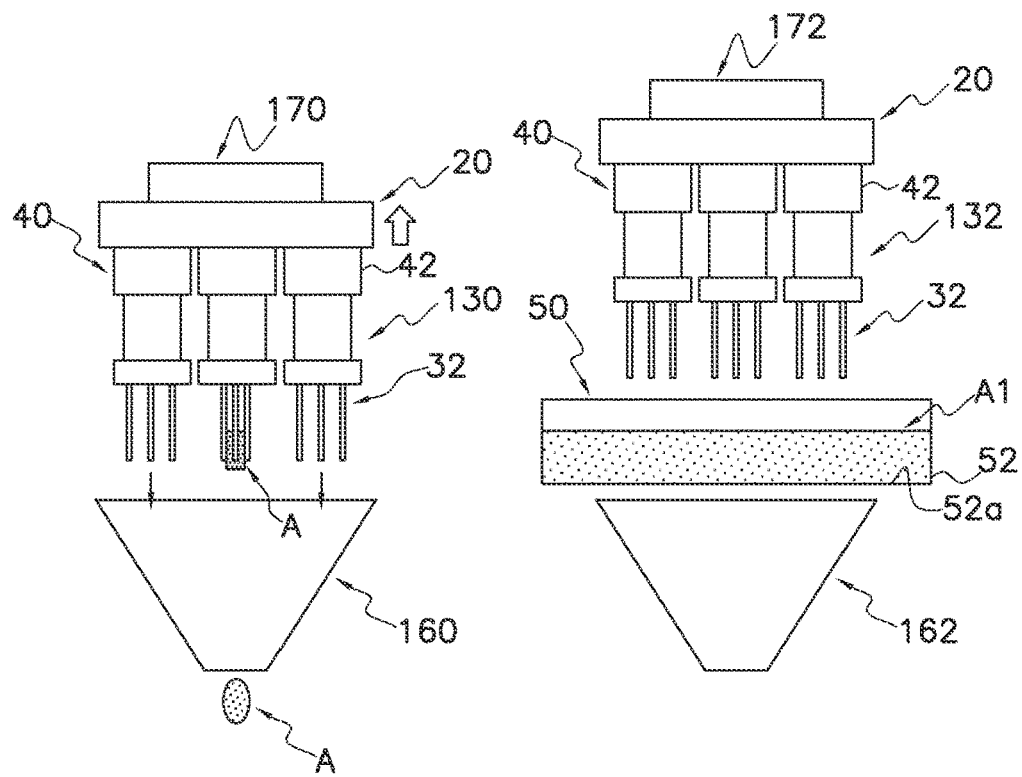
FIG. 11F is a general side view of main portions of the article discharge system for describing the operation of the article discharge system of FIGS. 9 and 10, and illustrates a state in which some of the first grippers have dropped the articles into the first discharge chute.

Fourth Step: The control unit 70, based on the result of the combination calculation in the third step, causes a predetermined combination of the first grippers 130 to release and discharge the articles A. In a case where there is more than one combination of the first grippers 130, the control unit 70 causes each combination of the first grippers 130 to release the articles A. With this, the first operation ends. (FIG. 11E to FIG. 11F)

Fifth Step: The control unit 70 starts the zero correction process on the weight acquisition units 40 corresponding to the first grippers 130 that were caused to release the articles A in the fourth step.

Figure 11G:
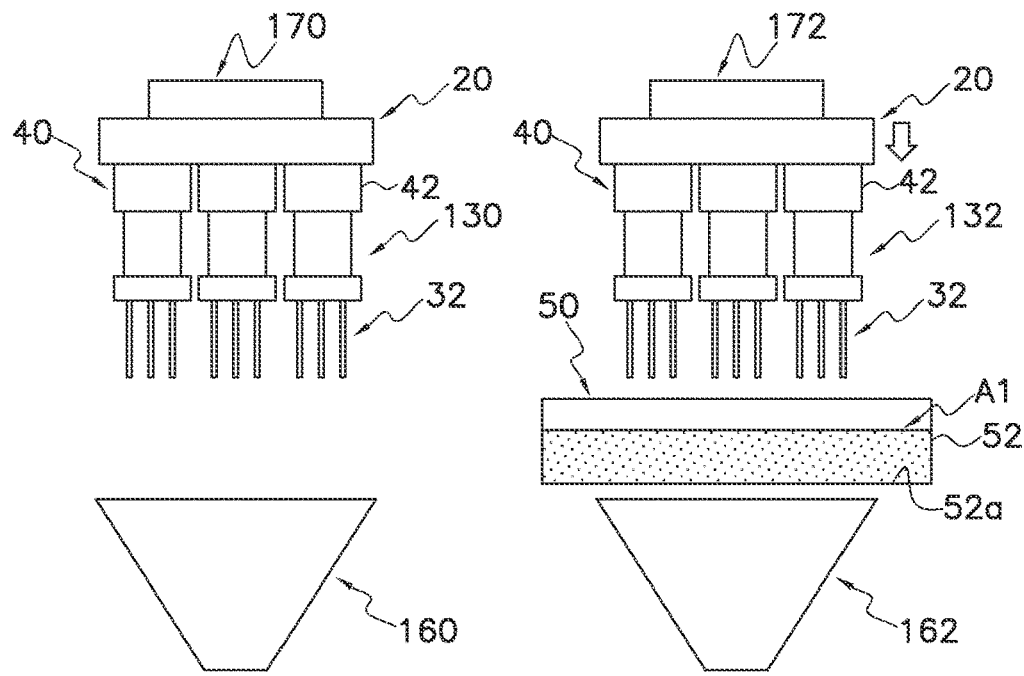
FIG. 11G is a general side view of main portions of the article discharge system for describing the operation of the article discharge system of FIGS. 9 and 10, and illustrates a state before second grippers grip the articles.
Figure 11H:
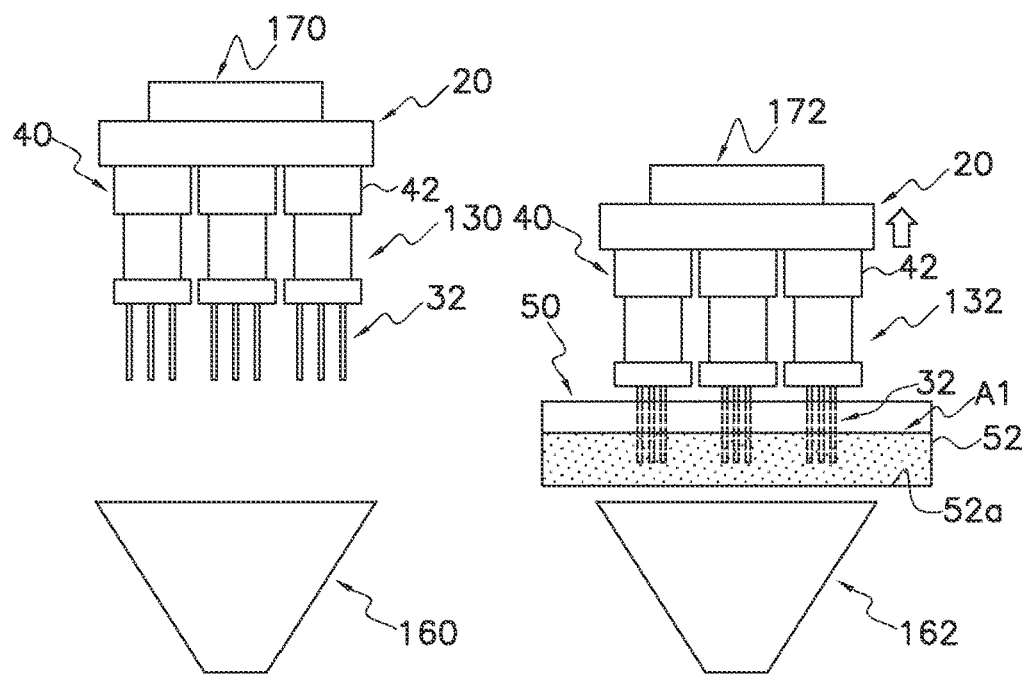
FIG. 11H is a general side view of main portions of the article discharge system for describing the operation of the article discharge system of FIGS. 9 and 10, and illustrates a state in which the gripping members of the second grippers have been inserted into the article group to grip the articles.
Figure 11I:
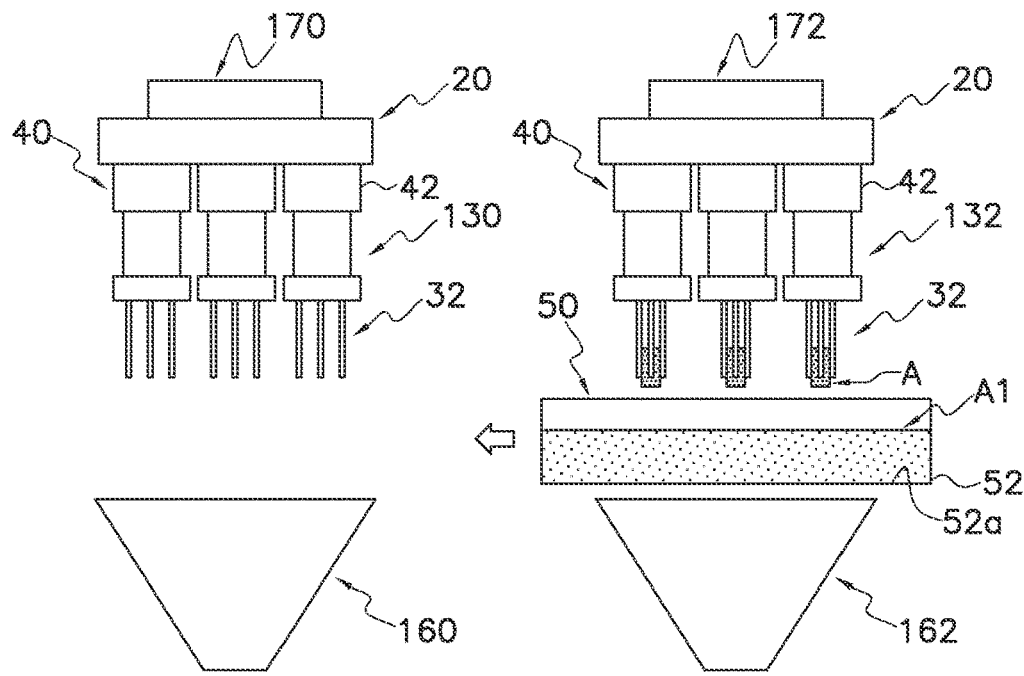
FIG. 11I is a general side view of main portions of the article discharge system for describing the operation of the article discharge system of FIGS. 9 and 10, and illustrates a state in which the gripping members of the second grippers that have gripped the articles have moved outside the article group holding container.

Sixth Step: The control unit 70 starts the second operation. Specifically, the control unit 70 causes the second grippers 132 to grip the articles A from the article group A1 placed in the placement unit 50 located in the second position. (FIG. 11G to FIG. 11I)

Figure 11J:
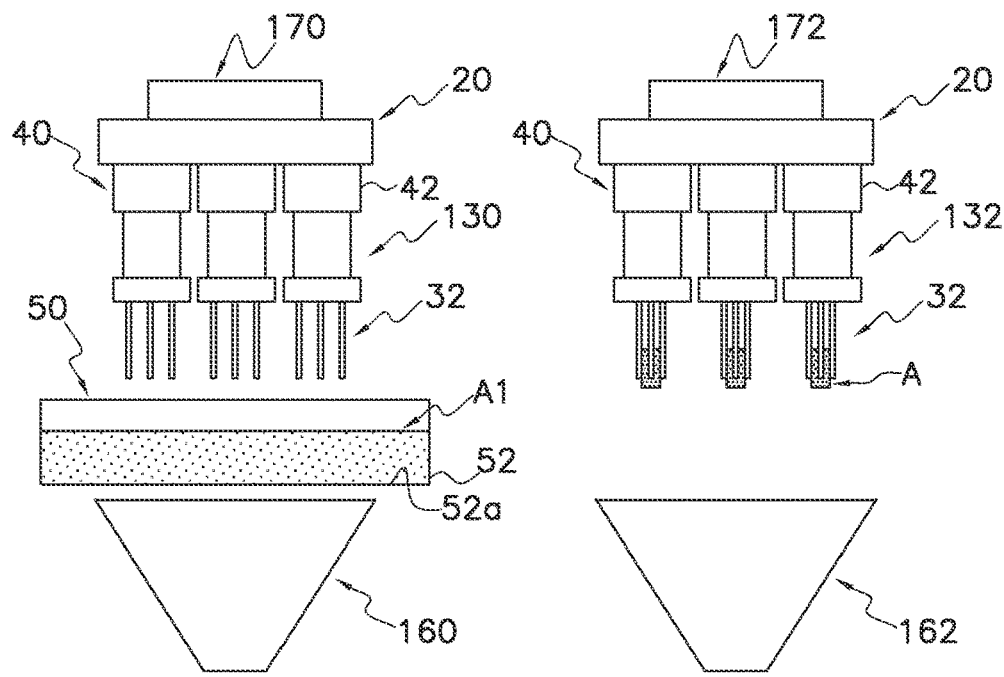
FIG. 11J is a general side view of main portions of the article discharge system for describing the operation of the article discharge system of FIGS. 9 and 10, and illustrates a state in which the placement unit has moved to the first position.

Seventh Step: The control unit 70 moves the placement unit 50 from the second position to the first position. (FIG. 11J)

Eighth Step: The control unit 70 acquires the weight values of the articles A that each of the second grippers 132 grips and performs a combination calculation using the acquired weight values.

Figure 11K:
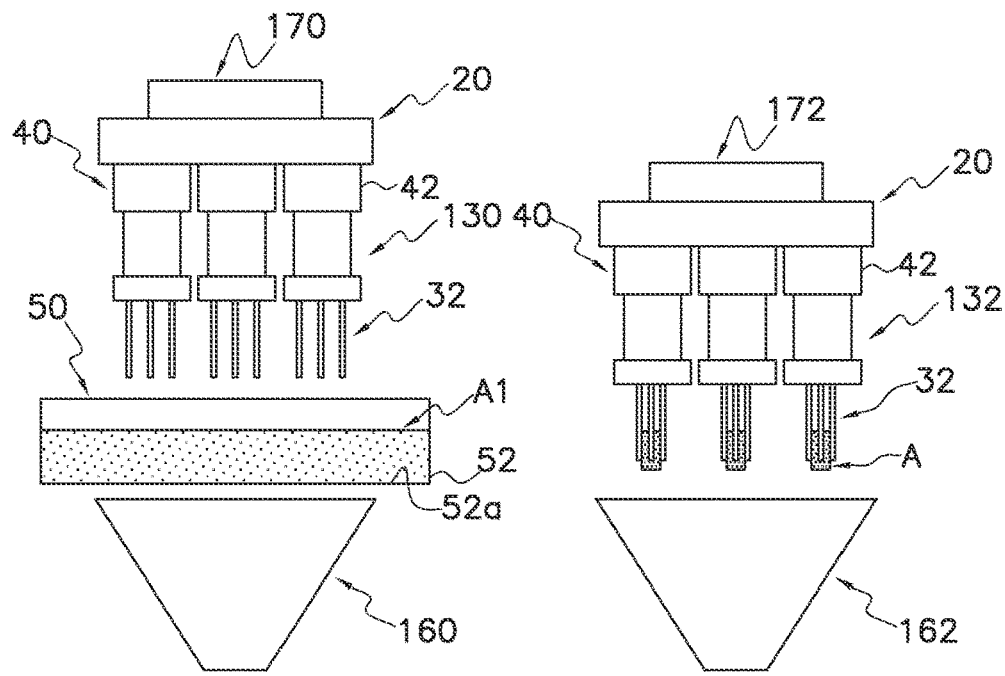
FIG. 11K is a general side view of main portions of the article discharge system for describing the operation of the article discharge system of FIGS. 9 and 10, and illustrates a state in which the second grippers have moved to the neighborhood of a second discharge chute to discharge the articles.
Figure 11L:
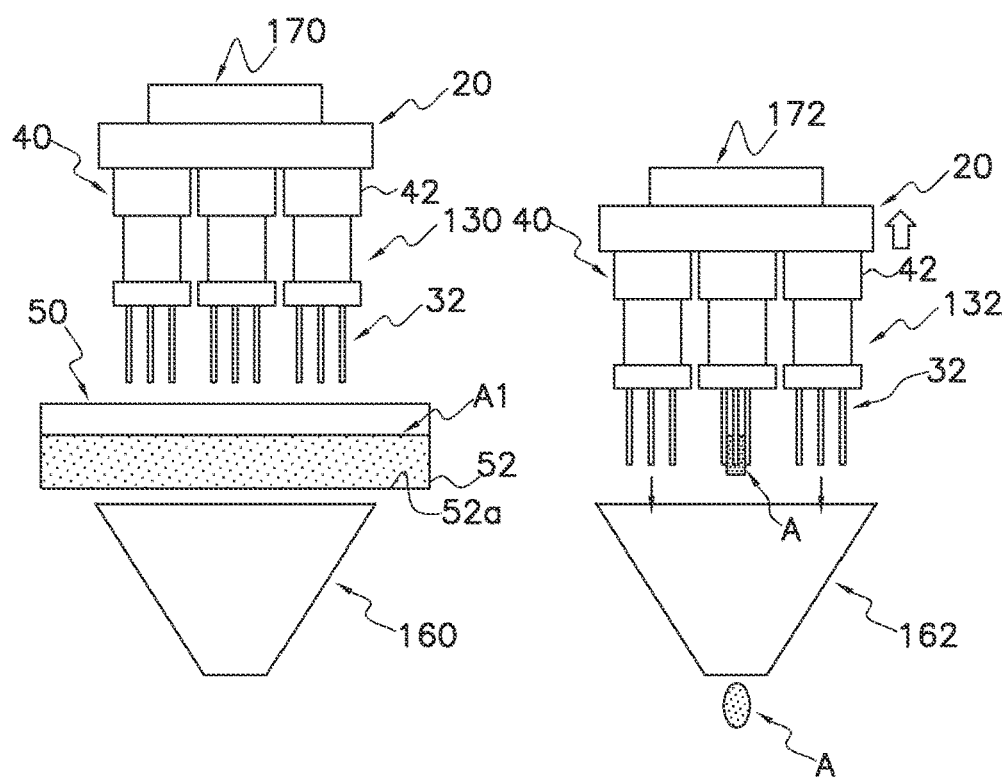
FIG. 11L is a general side view of main portions of the article discharge system for describing the operation of the article discharge system of FIGS. 9 and 10, and illustrates a state in which some of the second grippers have dropped the articles into the second discharge chute.

Ninth Step: The control unit 70, based on the result of the combination calculation in the eighth step, causes a predetermined combination of the second grippers 132 to release and discharge the articles A. In a case where there is more than one combination of the second grippers 132, the control unit 70 causes each combination of the second grippers 132 to release the articles A. With this, the second operation ends. (FIG. 11K to FIG. 11L)

Tenth Step: The control unit 70 starts the zero correction process on the weight acquisition units 40 corresponding to the second grippers 132 that were caused to release the articles A in the ninth step.

The sixth step can also be executed before the third step or the fourth step as long as it is after the completion of the second step when the placement unit 50 has moved to the second position. The first step can be also be executed before the eighth step or the ninth step as long as it is after the completion of the seventh step when the placement unit 50 has moved to the first position.

Furthermore, the zero correction process started in the fifth step ends before the start of the next first step. For example, the zero correction process started in the fifth step ends during the execution of the following sixth step to ninth step. The zero correction process started in the tenth step ends before the start of the next sixth step. For example, the zero correction process started in the tenth step ends during the execution of the following first step to fourth step.

Furthermore, at the end of the fifth step, there are cases where there are first grippers 130 that are still gripping the articles A (in other words, the first grippers 130 gripping the articles A whose weights were not selected for a combination). In this case, the control unit 70 controls the gripper drive units 34 to cause those first grippers 130 to release the articles A and drop the articles A into the placement unit 50 located in the first position after the completion of the seventh step and before the start of the next first step.

Likewise, at the end of the tenth step, there are cases where there are second grippers 132 that are still gripping the articles A (in other words, the second grippers 132 gripping the articles A whose weights were not selected for a combination). In this case, the control unit 70 controls the gripper drive units 34 to cause those second grippers 132 to release the articles A and drop the articles A into the placement unit 50 located in the second position after the completion of the second step and before the start of the next sixth step.

Furthermore, in the fourth step, in a case where there is more than one combination of the first grippers 130, as in the first embodiment, the control unit 70 may also cause the plural combinations of the first grippers 130 to release the articles A in a predetermined priority ranking.

Likewise, in the ninth step, in a case where there is more than one combination of the second grippers 132, as in the first embodiment, the control unit 70 may also cause the plural combinations of the second grippers 132 to release the articles A in a predetermined priority ranking.

(3) Characteristics

The article discharge system 200 of the second embodiment has the following characteristics in addition to the characteristics of the article discharge system 100 of the first embodiment.

The article discharge system 200 alternately grips, with the two discharge units 170, 172, the articles A from the article group A1 placed in the shared placement unit 50 and alternately discharges the articles A from the two discharge chutes 160, 162. Because of this, the article discharge system 200 can efficiently perform the operation of discharging the articles A.

Furthermore, the article discharge system 200, when implementing the zero correction process on the weight acquisition units 40 corresponding to each of the grippers 130, 132, can alternately implement the zero correction process on the weight acquisition units 40 corresponding to the first grippers 130 and the zero correction process on the weight acquisition units 40 corresponding to the second grippers 132.

To describe this by way of a specific example, let it be assumed that after the first grippers 130 have released the articles A, the zero correction process is started with respect to the weight acquisition units 40 corresponding to the first grippers 130 (the fifth step). At this time, the second grippers 132 are in a state in which they have started gripping or they are just about to start gripping the articles A. For that reason, the zero correction process cannot be started with respect to the weight acquisition units 40 corresponding to the second grippers 132. Likewise, let it be assumed that after the second grippers 132 have released the articles A, the zero correction process is started with respect to the weight acquisition units 40 corresponding to the second grippers 132. At this time, the first grippers 130 are in a state in which they have started gripping or they are just about to start gripping the articles A. For that reason, the zero correction process cannot be started with respect to the weight acquisition units 40 corresponding to the first grippers 130.

The article discharge system 200, for the reason given above, executes the zero correction process on the weight acquisition units 40 of the second discharge unit 172 while the first discharge unit 170 is performing the operation of discharging the articles A, and executes the zero correction process on the weight acquisition units 40 of the first discharge unit 170 while the second discharge unit 172 is performing the operation of discharging the articles A. Because of this, the article discharge system 200 can efficiently perform the zero correction process on the weight acquisition units 40 of the discharge units 170, 172 overall.

It will be noted that in the present embodiment the article discharge system 200 may also include three or more of the discharge units 170, 172. In this case, the article discharge system 200 uses the plural grippers 130, 132 to alternately grip the articles A from the article group A1 placed in the shared placement unit 50 and alternately discharge the articles A from the plural discharge chutes 160, 162.

Example Modifications

Example modifications of the above embodiments are described below. It will be noted that some or all of the content of each example modification may also be combined with the content of another example modification to the extent that they are not incompatible with each other.

(1) Example Modification A

The type of the grippers 30 in the first embodiment (also including the grippers 130, 132 of the second embodiment: the same holds true below) is merely an example, and various types of grippers can be applied as the grippers of the disclosure. For example, the grippers may also be grippers that grip the articles A by translationally moving a pair of gripping members toward each other.

Furthermore, in the above embodiments, the same type of the grippers 30 are attached to the movable member 20, but the grippers are not limited to this, and two or more types of the grippers 30 may also be attached to the movable member 20.

(2) Example Modification B

The article group holding container 52 of the placement unit 50 in the above embodiments is a cuboidal container, and the placement surface 52*a* (the bottom surface of the article group holding container 52) on which the article group A1 is placed is a horizontal surface (see FIG. 1).

However, the article group holding container 52 is not limited to this configuration and may also be a container having another shape. For example, the article group holding container 52 may also be a container in which the height position of the placement surface 52*a* on which the article group A1 is placed changes along the direction in which the grippers 30 are arranged. Specifically, when the article group holding container 52 is cut along the direction in which the grippers 30 are arranged, the bottom surface of the article group holding container 52 may also be formed substantially in the shape of a V. It will be noted that the advantage of forming the article group holding container 52 in this shape is that when the articles A are pulled out in the vicinity of the middle of the article group holding container 52, the articles A at the periphery of the article group holding container 52 move to the middle, and a state in which the articles A are not in the positions in which the grippers 30 grip the articles A is easily inhibited. In this example modification, to match the height position of the bottom surface of the article group holding container 52 of the placement unit 50, the movable member 20 has a shape in which the height position of the place to which the grippers 30 are attached differs depending on the grippers. In this case, the height of the place to which the sensor units 42 of the weight acquisition units 40 corresponding to each gripper 30 are attached also differs depending on the grippers 30.

Furthermore, as another example, the article group holding container 52 may also have a configuration where the cuboidal article group holding container 52 of the first embodiment is disposed tilted. In this case, the placement surface 52 (the bottom surface of the article group holding container 52) on which the article group A1 is placed is a uniform inclined surface.

(3) Example Modification C

In the above embodiments, the movable member 20 is moved in the vertical direction by the robot 10. Additionally, the grippers 30 attached to the movable member 20 move vertically downward from a predetermined position, come closer to the placement unit 50, and grip some of the articles A of the article group A1 placed in the placement unit 50.

Instead of this configuration, the movable member 20 may also be configured to be movable in a direction that is inclined with respect to the vertical direction. For example, in a case where the placement surface 52*a* slopes as in the placement unit 50 of example modification B, by configuring the movable member 20 to be moved in a generally perpendicular direction with respect to the placement surface 52*a*, it is easy for each of the grippers 30 to grip an appropriate quantity of the articles A even in a case where the height position of the placement surface 52*a* differs.

(4) Example Modification D

In the above embodiments, the placement unit drive unit 54 moves the placement unit 50 between the first position and the second position. However, in the first embodiment, the placement unit 50 is not limited to this configuration and may also be immovable.

Figure 12:
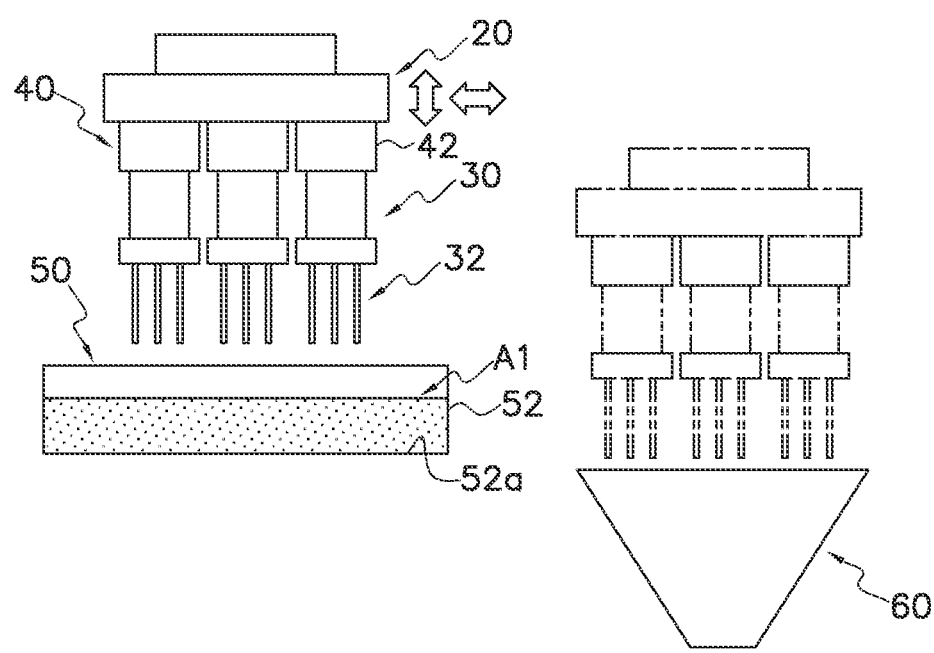
FIG. 12 is a general side view of main portions of an article discharge system pertaining to example modification D.

In this case, as shown in FIG. 12, it is preferred that the discharge chute 60 be disposed in a location other than directly under the placement unit 50 and that the movable member 20 be configured to be movable not only in the vertical direction but also in the horizontal direction. By configuring the article discharge system in this way, the articles A can be discharged by gripping, with the grippers 30, the articles A in the placement unit 50 (see the solid lines in FIG. 12), thereafter moving the grippers 30 to above the discharge chute 60 (see the long dashed double short dashed lines in FIG. 12), and causing the grippers 30 to release the articles A.

However, in the case of configuring the article discharge system in this way, there is the potential for the articles A to become more likely to drop because a force in the horizontal direction acts on the articles A when the grippers 30 move horizontally, so it is more preferred that the placement unit 50 be configured to be movable between the first position and the second position.

It will be noted that the configuration of this example modification can also be applied to the second embodiment. In this case, the first grippers 130 grip the articles A in the placement unit 50 above the immovable placement unit 50, and the second grippers 132 release and discharge the articles A above the second discharge chute 162. Thereafter, both of the grippers 130, 132 horizontally move so that their positions are reversed. Then, the second grippers 132 grip the articles A in the placement unit 50 above the immovable placement unit 50, and the first grippers 130 release and discharge the articles A above the first discharge chute 160. Thereafter, both of the grippers 130, 132 horizontally move so that their positions are reversed. By repeating the above series of operations, the grippers 130, 132 of the two discharge units 170, 172 can be used to alternately discharge the articles A without moving the placement unit 50.

(5) Example Modification E

In the above embodiments, the robot 10 moves the movable member 20 along a single axis. However, the robot 10 is not limited to this configuration and may also move the movable member 20 in plural directions. For example, the robot 10 may also reciprocally move the movable member 20 in a horizontal direction orthogonal to the vertical direction so as to shake off articles sticking to the gripping members 32 when moving the movable member 20 upward away from the placement unit 50 (when moving the position of the movable member 20 from the position illustrated in FIG. 8B to the position illustrated in FIG. 8C).

(6) Example Modification F

In the above embodiments, the articles A are discharged from the discharge chute 60, but the articles A may be discharged from the article discharge system in another way. For example, the article discharge system may have, instead of the discharge chute 60, a discharge conveyor for discharging the articles A from the article discharge system 100. Additionally, the grippers 30 corresponding to the weight values selected for a combination by the combination calculation may be configured to drop the articles A on the discharge conveyor by releasing the articles A in a predetermined position above the discharge conveyor, so that the discharge conveyor conveys the articles that have dropped onto the discharge conveyor.

(7) Example Modification G

Depending on the type of the articles A that are handled, there is the potential for a situation to occur where an article A gripped by one gripper 30 is also simultaneously gripped by another gripper 30. For example, in a case where the articles A are articles with a long length such as spaghetti (e.g., in a case where the length of the articles A is longer than the distance between the gripping areas of adjacent grippers 30), there is the potential for a phenomenon to occur where, as in FIG. 13A, an article A that one gripper 30 grips is also simultaneously gripped by another gripper 30. It will be noted that FIG. 13A is a schematic diagram for description, and illustration of articles A other than the article A gripped by more than one gripper 30 is omitted. When such a situation occurs, there is the concern that the weight of the articles discharged from the system will deviate from the target weight, resulting in a drop in the accuracy of the weight discharged from the system.

To inhibit the occurrence of such a state, it is preferred that, as shown in FIG. 13B, a separation member 80 disposed between the gripping members 32 of one gripper 30 and the gripping members 32 of the gripper 30 adjacent to that gripper 30 be provided above the placement unit 50 at least during a predetermined period after the gripping members 32 of the grippers 30 have gripped the articles A in the placement unit 50 and before they release the articles A. The separation member 80 is, for example, a cutter for cutting the articles A being simultaneously gripped by plural grippers 30 adjacent to each other by moving in the vertical direction.

It will be noted that when the grippers 30 release the articles A and drop the articles A into the discharge chute 60, there is the potential for the articles A to get caught on the separation member 80 if the separation member 80 is under the articles A that drop. For that reason, when the grippers 30 release the articles A and drop the articles A into the discharge chute 60, it is preferred that the separation member 80 move to a position where it will not obstruct the dropping of the articles A into the discharge chute 60. For example, the separation member 80 can be moved to a location other than directly under the grippers 30 at the same time that the placement unit 50 moves from the first position to the second position.

(8) Example Modification H

In the above embodiments, the article discharge systems 100, 200 have one movable member 20, but the article discharge systems 100, 200 are not limited to this and may also have more than one movable member 20 to which the plural grippers 30 are attached.

(9) Example Modification I

In the above embodiments, as an example of the arrangement of the grippers 30, a configuration was described where the plural grippers 30 are arranged in a staggered manner when the plural grippers 30 attached to the movable member 20 are viewed from the gripping member 32 side. However, this arrangement of the grippers 30 is merely an example, and the way in which the grippers 30 are arranged can be appropriately selected in accordance, for example, with the shape of the gripping areas of the grippers 30 and the dimension of the opening on the article input side of the discharge chute 60 into which the grippers 30 discharge the articles.

For example, in the above embodiments, a case where the gripping areas of the grippers 30 are generally circular in shape was described as an example, and the plural grippers 30 are arranged in a staggered manner when the plural grippers 30 attached to the movable member 20 are viewed from the gripping member 32 side. However, in a case where the gripping areas of each of the grippers 30 are generally rectangular in shape, the plural grippers 30 may also be arranged in a grid-like manner when the plural grippers 30 attached to the movable member 20 are viewed from the gripping member 32 side.

Furthermore, the positions where the grippers 30 are attached to the movable member 20 may also be configured to be adjustable.

<Additional Remark>

The article discharge systems described above are merely specific examples of the article discharge system and are not intended to limit the technical scope of the disclosure. It will be understood that various modifications may be made to the embodiments without departing from the spirit and scope of the disclosure.

INDUSTRIAL APPLICABILITY

The article discharge system pertaining to the invention can efficiently perform the operation of discharging articles.

REFERENCE SIGNS LIST

30 Grippers
40 Weight Acquisition Units
50 Placement Unit (Container)
70 Control Unit
100 Article Discharge System
170 First Discharge Unit
172 Second Discharge Unit
200 Article Discharge System
A1 Article Group
A Articles

CITATION LIST

Patent Literature

Patent Document 1: JP-A No. H6-3182

What is claimed is:

1. An article discharge system that pulls out and discharges some articles from an article group disposed in a container, the article discharge system comprising:

plural grippers that grip the articles;

weight acquisition units that acquire weight values of the articles that each of the plural grippers grips; and a control unit that causes the plural grippers to grip the some articles from the article group disposed in the container and, based on a result of a combination calculation using the weight values of the articles that each of the plural grippers grips, causes a predetermined combination of the grippers to release and discharge the articles, wherein during a period after the control unit has caused the predetermined combination of the grippers to release the articles and before the control unit next causes the predetermined combination of the grippers to grip the articles, the control unit implements a zero correction process on the weight acquisition units corresponding to only the predetermined combination of the grippers that were caused to release the articles.

2. The article discharge system of claim 1, wherein in the case of causing predetermined plural combinations of the grippers to release the articles in a predetermined priority ranking based on the result of the combination calculation, the control unit decides the priority ranking based on a number of times the grippers have gripped the articles since the zero correction process was last implemented on the weight acquisition units corresponding to the grippers.

3. The article discharge system of claim 1, wherein in the case of causing predetermined plural combinations of the grippers to release the articles in a predetermined priority ranking based on the result of the combination calculation, the control unit decides the priority ranking based on an amount of time that has elapsed since the zero correction process was last implemented on the weight acquisition units corresponding to the grippers.

4. The article discharge system of claim 1, further comprising a first discharge unit that has the plural grippers and a second discharge unit that has the plural grippers, wherein the control unit alternately implements a first operation in which it causes the plural grippers of the first discharge unit to grip the some articles from the article group disposed in the container and, based on the result of the combination calculation, causes a predetermined combination of the grippers to release and discharge the articles and a second operation in which it causes the plural grippers of the second discharge unit to grip the some articles from the article group disposed in the container and, based on the result of the combination calculation, causes a predetermined combination of the grippers to release and discharge the articles.

5. The article discharge system of claim 4, wherein in the first operation the control unit causes the plural grippers of the first discharge unit to grip the articles and thereafter moves the container to a position in which the control unit can cause the plural grippers of the second discharge unit to grip the articles, after completion of the first operation the control unit implements a zero correction process on the weight acquisition units corresponding to the plural grippers of the first discharge unit that were caused to release the articles, in the second operation the control unit causes the plural grippers of the second discharge unit to grip the articles and thereafter moves the container to a position in which the control unit can cause the plural grippers of the first discharge unit to grip the articles, and after completion of the second operation the control unit implements a zero correction process on the weight acquisition units corresponding to the plural grippers of the second discharge unit that were caused to release the articles.

* * * * *